United States Patent
Fisher et al.

(10) Patent No.: US 11,875,442 B1
(45) Date of Patent: Jan. 16, 2024

(54) ARTICULATED PART EXTRACTION FROM SPRITE SHEETS USING MACHINE LEARNING

(71) Applicants: Adobe Inc., San Jose, CA (US);
University of Massachusetts, Boston, MA (US)

(72) Inventors: Matthew David Fisher, San Carlos, CA (US); Zhan Xu, Amherst, MA (US); Yang Zhou, Sunnyvale, CA (US); Deepali Aneja, Seattle, WA (US); Evangelos Kalogerakis, Amherst, MA (US)

(73) Assignee: Adobe Inc., San Jose, CA (US)

( * ) Notice: Subject to any disclaimer, the term of this patent is extended or adjusted under 35 U.S.C. 154(b) by 66 days.

(21) Appl. No.: 17/829,120

(22) Filed: May 31, 2022

(51) Int. Cl.
| | |
|---|---|
| *G06T 13/80* | (2011.01) |
| *G06V 10/762* | (2022.01) |
| *G06T 13/40* | (2011.01) |
| *G06V 10/774* | (2022.01) |
| *G06T 7/246* | (2017.01) |
| *G06V 10/77* | (2022.01) |

(52) U.S. Cl.
CPC .............. *G06T 13/80* (2013.01); *G06T 7/251* (2017.01); *G06T 13/40* (2013.01); *G06V 10/762* (2022.01); *G06V 10/7715* (2022.01); *G06V 10/7747* (2022.01)

(58) Field of Classification Search
CPC ......... G06T 13/80; G06T 7/251; G06T 13/40; G06V 10/762; G06V 10/7715; G06V 10/7747
See application file for complete search history.

(56) References Cited

PUBLICATIONS

Achanta, R., et al., "SLIC Superpixels Compared to State-of-the-Art Superpixel Methods," Journal of Latex Class Files, Dec. 2011, vol. 6, No. 1, pp. 1-8.
Adobe Character Animator, Motion Capture Animation Software, available online at https://www.adobe.com/products/character-animator.html, retrieved Sep. 13, 2023, pp. 1-11.
(Continued)

*Primary Examiner* — Jitesh Patel
(74) *Attorney, Agent, or Firm* — Nicholson De Vos Webster & Elliott LLP

(57) ABSTRACT

Embodiments are disclosed for articulated part extraction using images of animated characters from sprite sheets by a digital design system. In particular, in one or more embodiments, the disclosed systems and methods comprise receiving an input including a plurality of images depicting an animated character in different poses. The disclosed systems and methods further comprise, for each pair of images in the plurality of images, determining, by a first machine learning model, pixel correspondences between pixels of the pair of images, and determining, by a second machine learning model, pixel clusters representing the animated character, each pixel cluster corresponding to a different structural segment of the animated character. The disclosed systems and methods further comprise selecting a subset of clusters that reconstructs the different poses of the animated character. The disclosed systems and methods further comprise creating a rigged animated character based on the selected subset of clusters.

20 Claims, 11 Drawing Sheets
(2 of 11 Drawing Sheet(s) Filed in Color)

(56) References Cited

PUBLICATIONS

Ballard, D.H., "Generalizing the Hough Transform to Detect Arbitrary Shapes," Pattern Recognition, 13(2), 1981, pp. 111-122.
Borosán, P., et al., "RigMesh: Automatic Rigging for Part-Based Shape Modeling and Deformation," ACM Transactions on Graphics, 31(6), Nov. 2012, pp. 1-9.
Chang, H.J., et al., "Highly Articulated Kinematic Structure Estimation Combining Motion and Skeleton Information," IEEE Transactions on Pattern Analysis and Machine Intelligence, 40(9), Sep. 2017, pp. 2165-2179.
Choudhury, S., et al., "Unsupervised Part Discovery from Contrastive Reconstruction," NeurIPS Proceedings 2021, arXiv:2111.06349v2 [cs.CV], Mar. 21, 2022, pp. 1-15.
Collins, E., et al., "Deep Feature Factorization For Concept Discovery," Proceedings of the European Conference on Computer Vision (ECCV), Jun. 2018, pp. 336-352.
Del Pero, L. et al., "Discovering the physical parts of an articulated object class from multiple videos," Proceedings of the IEEE Conference on Computer Vision and Pattern Recognition (CVPR), Jun. 2016, pp. 714-723.
Freund, Robert M., Primal-Dual Interior-Point Methods for Linear Programming based on Newton's Method,: Massachusetts Institute of Technology, Mar. 2004, retrieved online at: http://ocw.abu.edu.ng/courses/sloan-school-of-management/15-084j-nonlinear-programming-spring-2004/lecture-notes/lec14_int_pt_mthd.pdf, pp. 1-24.
Hayden, D.S., et al., "Nonparametric Object and Parts Modeling With Lie Group Dynamics," Proceedings of the IEEE/CVF Conference on Computer Vision and Pattern Recognition (CVPR), Jun. 2020, pp. 7426-7435.
Hinz, T., et al., "CharacterGAN: Few-Shot Keypoint Character Animation and Reposing," arXiv:2102.03141v3 [cs.CV], Jan. 12, 2022, pp. 1-10.
Horn, B.K.P., "Closed-form solution of absolute orientation using unit quaternions," Journal of the Optical Society of America A, 4(4), Apr. 1987, pp. 629-642.
Huang, J., et al., "MultiBodySync: Multi-Body Segmentation and Motion Estimation via 3D Scan Synchronization," arXiv:2101.06605v3 [cs.CV], Mar. 29, 2021, pp. 1-22.
Hung, W.-C., et al., "SCOPS: Self-Supervised Co-Part Segmentation," arXiv:1905.01298v1 [cs.CV], May 3, 2019, pp. 1-22.
Jiang, W., et al., "COTR: Correspondence Transformer for Matching Across Images," arXiv:2103.14167v2 [cs.CV], Aug. 17, 2021, pp. 1-13.
Joulin, A., et al., "Multi-Class Cosegmentation," IEEE Conference on Computer Vision and Pattern Recognition, Jun. 2012, pp. 542-549.
Kraehenbuehl, P., et al., "Parameter Learning and Convergent Inference for Dense Random Fields," Proceedings of the 30th International Conference on Machine Learning, PMLR 28(3), 2013, pp. 513-521.
Kuhn, H.W., "The Hungarian method for the assignment problem," Naval Research Logistics Quarterly, 2(1-2), 1955. pp. 83-97.
Li, H., et al., "Mobility Fitting using 4D RANSAC," Eurographics Symposium on Geometry Processing, vol. 35, No. 5, 2016, pp. 79-88.
Li, T., et al., "Projective Factorization of Multiple Rigid-Body Motions," IEEE Conference on Computer Vision and Pattern Recognition, 2007, pp. 1-6.
Liu, S., et al., "Skinning Cubic Bezier Splines and Catmull-Clark Subdivision Surfaces," ACM Transactions on Graphics, 33(6), 2014, pp. 1-9.
Ng, A.Y., et al., "On Spectral Clustering: Analysis and an algorithm," NeurIPS Proceedings, 2001, pp. 1-8.
Oord, A., et al., "Representation Learning with Contrastive Predictive Coding," arXiv:1807.03748v2 [cs.LG], Jan. 22, 2019, pp. 1-13.
Poursaeed, O., et al., "Neural Puppet: Generative Layered Cartoon Characters," arXiv:1910.02060v3 [cs.CV], Oct. 12, 2020, pp. 1-11.
Radford, A., et al., "Learning Transferable Visual Models From Natural Language Supervision," arXiv: 1910.02060v3 [cs.CV], Oct. 12, 2020, pp. 1-48.
Raghavan, P., et al., "Randomized rounding: A technique for provably good algorithms and algorithmic proofs," Combinatorica, vol. 7, No. 4, 1987, pp. 365-374.
Ronneberger, O., et al., "U-Net: Convolutional Networks for Biomedical Image Segmentation," arXiv:1505.04597v1 [cs.CV], May 18, 2015, pp. 1-8.
Russakovsky, O., et al., "ImageNet Large Scale Visual Recognition Challenge, International Journal of Computer Vision," arXiv: 1409.0575v3 [cs.CV], Jan. 30, 2015, pp. 1-43.
Sabour, S., et al., "Unsupervised Part Representation by Flow Capsules," arXiv:2011.13920v2 [cs.CV], Feb. 19, 2021, pp. 1-11.
Shugrina, M. et al., "Creative Flow+ Dataset," Proceedings of the IEEE/CVF Conference on Computer Vision and Pattern Recognition (CVPR), Jun. 2019, pp. 5379-5388.
Siarohin, A., et al., "Motion-supervised Co-Part Segmentation," arXiv:2004.03234v2 [cs.CV], Apr. 15, 2020, pp. 1-26.
Song, Y., et al., "Embedding 3D Geometric Features for Rigid Object Part Segmentation," Proceedings of the IEEE International Conference on Computer Vision (ICCV), Oct. 2017, pp. 580-588.
Sorkine, O., et al., "As-Rigid-As-Possible Surface Modeling," Eurographics Symposium on Geometry Processing, 2007, pp. 1-8.
Teed, Z., et al., "RAFT: Recurrent All-Pairs Field Transforms for Optical Flow," arXiv:2003.12039v3 [cs.CV], Aug. 25, 2020, pp. 1-21.
Tokmakov, P., et al., "Learning Motion Patterns in Videos," arXiv: 1612.07217v2 [cs.CV], Apr. 10, 2017, pp. 1-9.
Tokmakov, P., et al., "Learning to Segment Moving Objects," arXiv:1712.01127v1 [cs.CV], Dec. 1, 2017, pp. 1-18.
Tron, R., et al., "A Benchmark for the Comparison of 3-D Motion Segmentation Algorithms," IEEE Conference on Computer Vision and Pattern Recognition, Jun. 2007, pp. 1-8.
Tsai, Y.-H., et al., "Semantic Co-segmentation in Videos," ECCV 2016, Part IV, LNCS 9908, pp. 760-775.
Vicente, S., et al., "Object Cosegmentation," Proceedings of IEEE Computer Society Conference on Computer Vision and Pattern Recognition (CVPR), Jul. 2011, pp. 1-8.
Mdal, R., et al., "Two-View Multibody Structure from Motion," International Journal of Computer Vision, vol. 68, Apr. 2006, pp. 7-25.
Wang, X., et al., "Shape2Motion: Joint Analysis of Motion Parts and Attributes From 3D Shapes," Proceedings of the IEEE/CVF Conference on Computer Vision and Pattern Recognition (CVPR), Jun. 2019, pp. 8876-8884.
Willett, N.S., et al., "Secondary Motion for Performed 2D Animation," Proceedings of the 30th Annual ACM Symposium on User Interface Software and Technology, Oct. 2017, pp. 97-108.
Xu, X., et al., "3D Rigid Motion Segmentation with Mixed and Unknown No. of Models," arXiv:1908.06087v1 [cs.CV], Aug. 16, 2019, pp. 1-15.
Xu, Z., et al., "Unsupervised Discovery of Parts, Structure, and Dynamics," arXiv: 1903.05136v1 [cs.CV], Mar. 12, 2019, pp. 1-15.
Yan, J., et al., "A Factorization-Based Approach for Articulated Nonrigid Shape, Motion and Kinematic Chain Recovery From Video," IEEE Transactions on Pattern Analysis and Machine Intelligence, 30(5), May 2008, pp. 865-877.
Yang, G., et al., "Learning to Segment Rigid Motions From Two Frames," arXiv:2101.03694v1 [cs.CV], Jan. 11, 2021, pp. 1-15.
Yi, L. et al., "Deep Part Induction from Articulated Object Pairs," arXiv:1809.07417v1 [cs.CV], Sep. 19, 2018, pp. 1-18.
Yu, J., et al., "Free-Form Image Inpainting With Gated Convolution," Proceedings of the IEEE/CVF International Conference on Computer Vision (ICCV), 2019, pp. 4471-4480.
Yuan, C., et al., "Detecting Motion Regions in the Presence of a Strong Parallax from a Moving Camera by Multiview Geometric Constraints," IEEE Transactions on Pattern Analysis and Machine Intelligence, 29(9), Oct. 2007, pp. 1627-1641.
Zhang, C., et al., "CycleSegNet: Object Co-Segmentation With Cycle Refinement and Region Correspondence," arXiv:2101.01308v2 [cs.CV], Jun. 2, 2021, pp. 1-13.

(56) References Cited

PUBLICATIONS

Zhang, R., et al., "The Unreasonable Effectiveness of Deep Features as a Perceptual Metric," Proceedings of the IEEE Conference on Computer Vision and Pattern Recognition (CVPR), Jan. 2018, pp. 586-595.

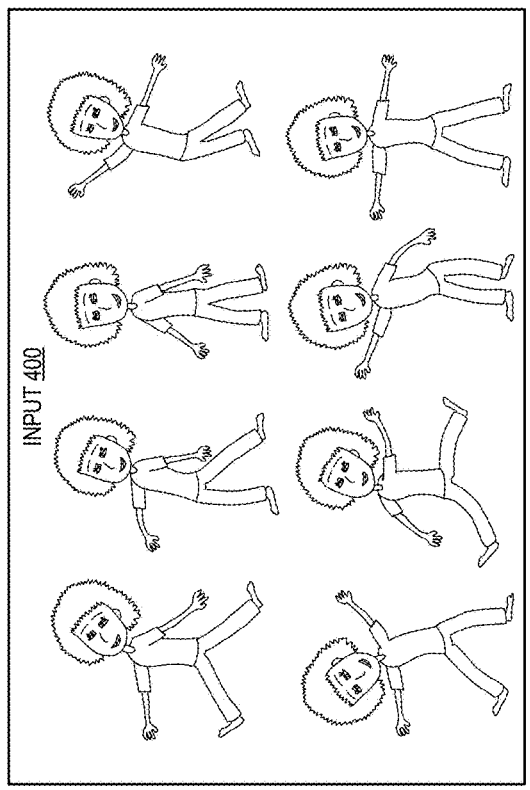
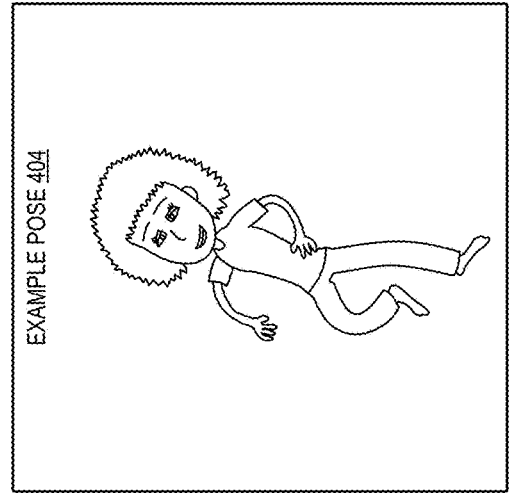
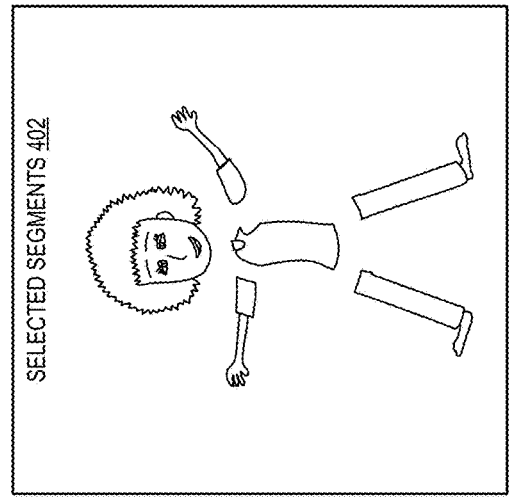
FIG. 4

900

RECEIVING A FIRST TRAINING INPUT INCLUDING IMAGES REPRESENTING DIFFERENT POSES OF AN ANIMATED CHARACTER AND A SECOND TRAINING INPUT INCLUDING PIXEL CORRESPONDENCES BETWEEN PAIRS OF POSES OF THE DIFFERENT POSES 902

TRAINING, BY THE PROCESSING DEVICE, A FIRST MACHINE LEARNING MODEL BASED ON THE FIRST TRAINING INPUT TO GENERATE A TRAINED FIRST MACHINE LEARNING MODEL TO DETERMINE PIXEL CORRESPONDENCES BETWEEN PIXELS OF A PAIR OF POSES FROM THE DIFFERENT POSES 904

TRAINING, BY THE PROCESSING DEVICE, A SECOND MACHINE LEARNING MODEL BASED ON THE SECOND TRAINING INPUT TO GENERATE A TRAINED SECOND MACHINE LEARNING MODEL TO DETERMINE PIXEL CLUSTERS REPRESENTING STRUCTURAL SEGMENTS OF THE ANIMATED CHARACTER 906

*FIG. 9*

ARTICULATED PART EXTRACTION FROM SPRITE SHEETS USING MACHINE LEARNING

BACKGROUND

Animation involves the manipulation of characters and/or objects to give the appearance of movement. The traditional method of animating characters is to independently draw each frame of animation. Over time, tools have been developed to decrease the amount of time required to create animation. For example, tools have been developed to allow rigged two-dimensional characters, or puppets, to be easily rendered in different poses by manipulating a character rig representation of the character. Thus, an important part of the animation process is creating or obtaining a character rig of an animated character. Existing solutions that involve the manual creation of character rigs have limitations and drawbacks, as they require advanced experience and can be time-consuming.

SUMMARY

Introduced here are techniques/technologies that allow a digital design system to extract articulated parts or segments of an animated character using a number of poses of the animated character provided on a sprite sheet. The digital design system uses two neural networks to identify candidate segments from the number of poses and an optimization algorithm to select segments from the candidate segments to generate a character rig of the animated character that can be used to produce animation.

In particular, in one or more embodiments, a digital design system can receive a sprite sheet including a plurality of images depicting an animated character in different poses as an input. The digital design system can then generate image pairs from the plurality of images and provide each image pair to a first machine learning model configured to determine pixel correspondences between pixels of the image pair. Using the pixel correspondence data, a second machine learning model can then determine pixel clusters, where each pixel cluster corresponds to a different segment of the animated character (e.g., head, torso, arms, etc.). The pixel clusters can be identified as candidate segments of the animated character. The digital design system then uses an optimization algorithm to determine which segments of the candidate segments should be selected as segments that, when formed into a character rig, can reproduce the different poses in the sprite sheet with minimal reconstruction error.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying drawings in which:

FIG. 4 illustrates an example input to a digital design system and output of an articulated part extraction process in accordance with one or more embodiments;

FIG. 9 illustrates a flowchart of a series of acts in a method of training neural networks to extract articulated parts of animated characters from sprite sheets in accordance with one or more embodiments;

DETAILED DESCRIPTION

Figure 1:
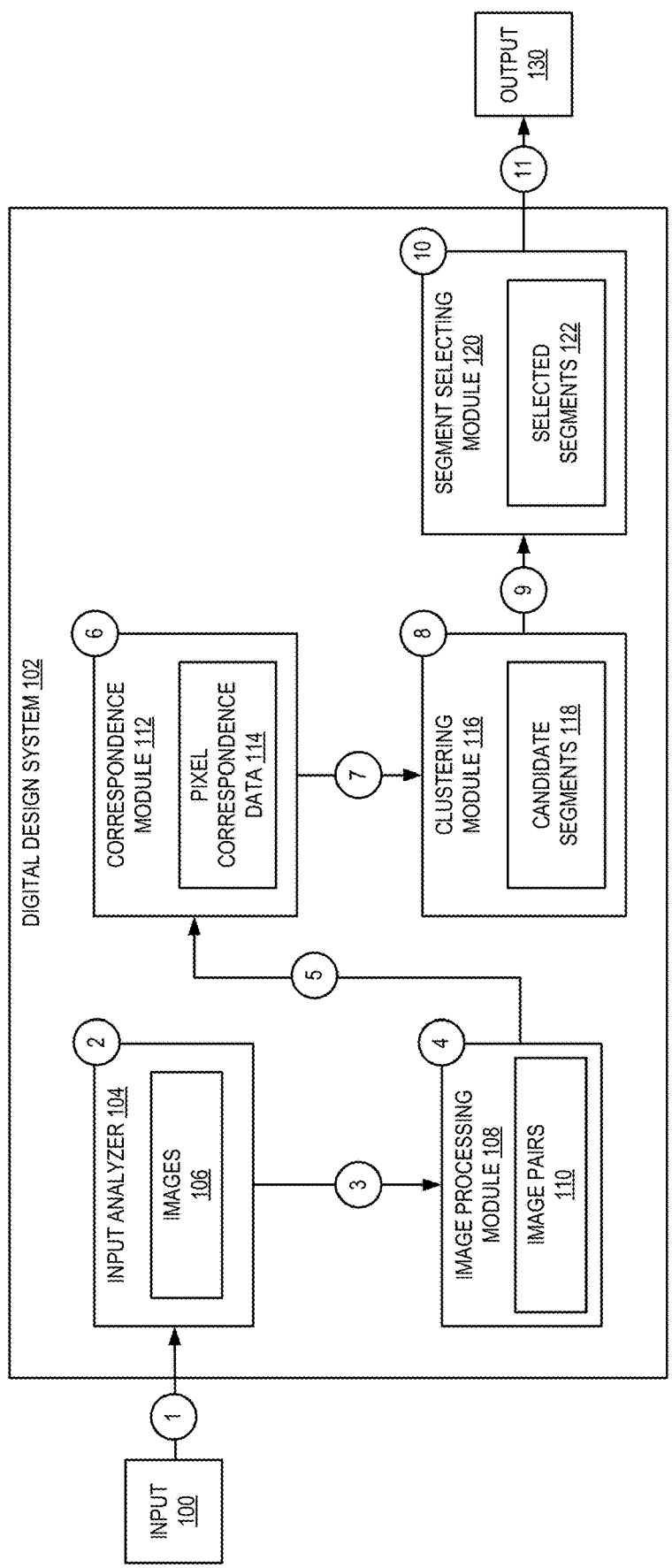
FIG. 1 illustrates a diagram of a process of using machine learning models to perform articulated part extraction of animated characters from sprite sheets in accordance with one or more embodiments.

One or more embodiments of the present disclosure include a digital design system that uses trained neural networks to select segments from a plurality of different poses of an animated character. Once selected, the segments can be used to generate a character rig capable of reproducing the plurality of different poses of the animated character with minimal reconstruction error. Character rigs, or rigged puppets, is one of the most prevalent representations to create two-dimensional character animations. Creating these character rigs requires partitioning animated characters into independently moving segments (e.g., head, torso, arm, leg, etc.), where the segments can be manipulated or deformed to create different poses and movement of the animated character.

One existing solution of creating character rigs involves an animator specifically defining the points and skeletal structure of the animated character. Another solution requires an animator to define segments of the character and the range of motions of each of the segments. Character rigs can also be created using sprite sheets that depict different poses and configurations of a character. The animators then manually segment out the common parts in the sprite sheet and digitally stitch them together to create the final character rig, which can then be articulated to reconstruct the poses in the sprite sheet. These solutions can be time-consuming and require significant skill or expertise, as they typically require a user to either manually segment out parts of an animated character or to create a full character rig, with knowledge and understanding of the range of motion of each segment.

To address these issues, the digital design system receives an input sprite sheet that includes a plurality of images of an animated character, where each of the plurality of images depicts the animated character in a different pose. The digital design system the generates images pairs from the sprite sheet image, where each image pair of image pairs includes a pair of different poses from the sprite sheet image. For example, where the image sprite sheet includes six different poses of the animated character, the digital design system can generate all unique pair combinations (e.g., fifteen image pairs). The image pairs are then passed to a correspondence module, a machine learning model trained to process each image pair separately to determine the pixel correspondences between pixels of the image pair based on comparing the motions of pixels in one image to the motions of pixels in other image in the image pair. For example, for each pixel in a first image of the image pair, the correspondence module predicts the closest pixel in the second image of the image pair, based on pixel features.

The digital design system then passes the pixel correspondence data to a clustering module, a second machine learning model trained to determine pixel clusters representing the animated character based on the determined pixel correspondences for an image pair. For example, the clustering module uses the pixel correspondence data between the first image and the second image of an image pair to determine segments of the animated character by grouping or clustering pixels with similar motion transformations. Each pixel cluster determined by the clustering module corresponds to a different structural segment of the animated character (e.g., head, torso, arm, leg, etc.). To efficiently process the pixel correspondence data, the clustering module uses a superpixel segmented version of the images in the image pair, where the pixels that are in a same superpixel share the same or similar motion transformations. This allows the clustering module to analyze fewer pixels to generate the clusters.

After processing each image pair separately through the correspondence module and the clustering module, the resulting output is a plurality of candidate segments for each of the image pairs. For example, the correspondence module and the clustering module can produce a head segment, a torso segment, arm segments, and leg segments as the candidate segments for each image pair. The digital design system then selects a subset of segments from the plurality of candidate segments that best reconstruct the poses in the input sprite sheet image with minimal reconstruction error, while also having a minimum overlap with each other. The subset of segments can then be used to create a rigged animated character that can be manipulated to produce animation of the rigged animated character.

The embodiments described herein provide a significant increase in speed and scalability. For example, by learning on training sprite sheets, the digital design system described herein is trained to determine how to predict corresponding pixels of an animated character in different poses, predict which pixels of an animated character have similar transformations, indicating that they are pixels from a same segment of the animated character, and using an optimization algorithm select the segments that best reconstruct the poses in the sprite sheet. These selected segments can then be used to create the character rig for the animated character.

FIG. 1 illustrates a diagram of a process of using machine learning models to perform articulated part extraction of animated characters from sprite sheets in accordance with one or more embodiments. As shown in FIG. 1, the digital design system 102 receives an input 100, as shown at numeral 1. For example, the digital design system 102 receives the input 100 from a user via a computing device or from a memory or storage location. In one or more embodiments, the input 100 includes a sprite sheet image depicting an animated character in a number of different poses. In one or more embodiments, the input 100 includes P character RGB raster images $I_i$ and their accompanying foreground binary masks $M_i=[1, \ldots, P]$, where P is the total number of poses. As illustrated in FIG. 1, the digital design system 102 includes an input analyzer 104 that receives the input 100.

As illustrated in FIG. 1, the digital design system 102 includes an input analyzer 104 that receives the input 100. In some embodiments, the input analyzer 104 analyzes the input 100, at numeral 2, to identify the images 106 of the animated character in the sprite sheet image. After the input analyzer 104 analyzes the input 100 and extracts the images 106, the images 106 are sent to an image processing module 108, as shown at numeral 3. In one or more other embodiments, the input analyzer 104 optionally stores the images 106 in a memory or storage location for later access.

In one or more embodiments, the image processing module 108 generates images pairs 110, at numeral 4. Each image pair of image pairs 110 includes a pair of different poses from the sprite sheet image. In some embodiments, the image processing module 108 generates all possible pair combinations from the poses in the sprite sheet image. For example, given a sprite sheet image that includes eight images of an animated character in a plurality of different poses, the image processing module 108 generates 28 different pairs of poses as image pairs 110. In other embodiments, the image processing module 108 generates less than all possible pair combinations. After the image processing module 108 generates images pairs 110, the images pairs 110 are sent to a correspondence module 112, as shown at numeral 5.

In one or more embodiments, the correspondence module 112 determines the pixel correspondence data 114 for each pair of the image pairs 110, at numeral 6. In one or more embodiments, the correspondence module 112 is a trained neural network. In one or more embodiments, a neural network includes deep learning architecture for learning representations of images. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

In one or more embodiments, pixel correspondence data 114 determined by the correspondence module 112 captures the candidate motions of pixels from a first image (e.g., a source image, $I_s$) to a second image (e.g., a target image, $I_t$) of an image pair. In one or more embodiments, given a pair of images $I_s$, $I_t$ and corresponding binary foreground masks $M_s$, $M_t$ from the image pairs 110, the correspondence module 112 predicts the candidate motion mapping of foreground pixels between the two images in an image pair. For example, for each pixel in the first image, the correspondence module 112 predicts the closest pixels in the second image, based on pixel features. In some embodiment, the correspondence module 112 first concatenates each input image and masks and transforms them into a feature map, $F_s \in \mathbb{R}^{H \times W \times 64}$ using a convnet. In one embodiment, the neural network of the correspondence module 112 follows a U-Net architecture and includes ten convolutional layers in its encoder and another ten layers in its decoder. The convolutional layers in the encoder implement gated convolution, which offers a gating mechanism such that the background pixels indicated by the masks are prevented from influencing the foreground pixel correspondences. The feature vector of each pixel is further normalized according to its L2 norm to acquire a unit-length feature vector.

For each foreground pixel x=(x,y) in the first image $I_s$, a corresponding pixel x'=(x',y') in the second image $I_t$ can be identified as the pixel with the most similar features, based on feature vectors, in terms of cosine similarity, using the following:

$$x'=\arg\max_{u \in I_t, M_t(u)=1} \langle (F_s(x) \cdot F_t(u)) \rangle$$

The correspondence module 112 repeats this process for each pixel in the first image of an image pair to generate the pixel correspondence data 114 for that image pair.

Figure 2:
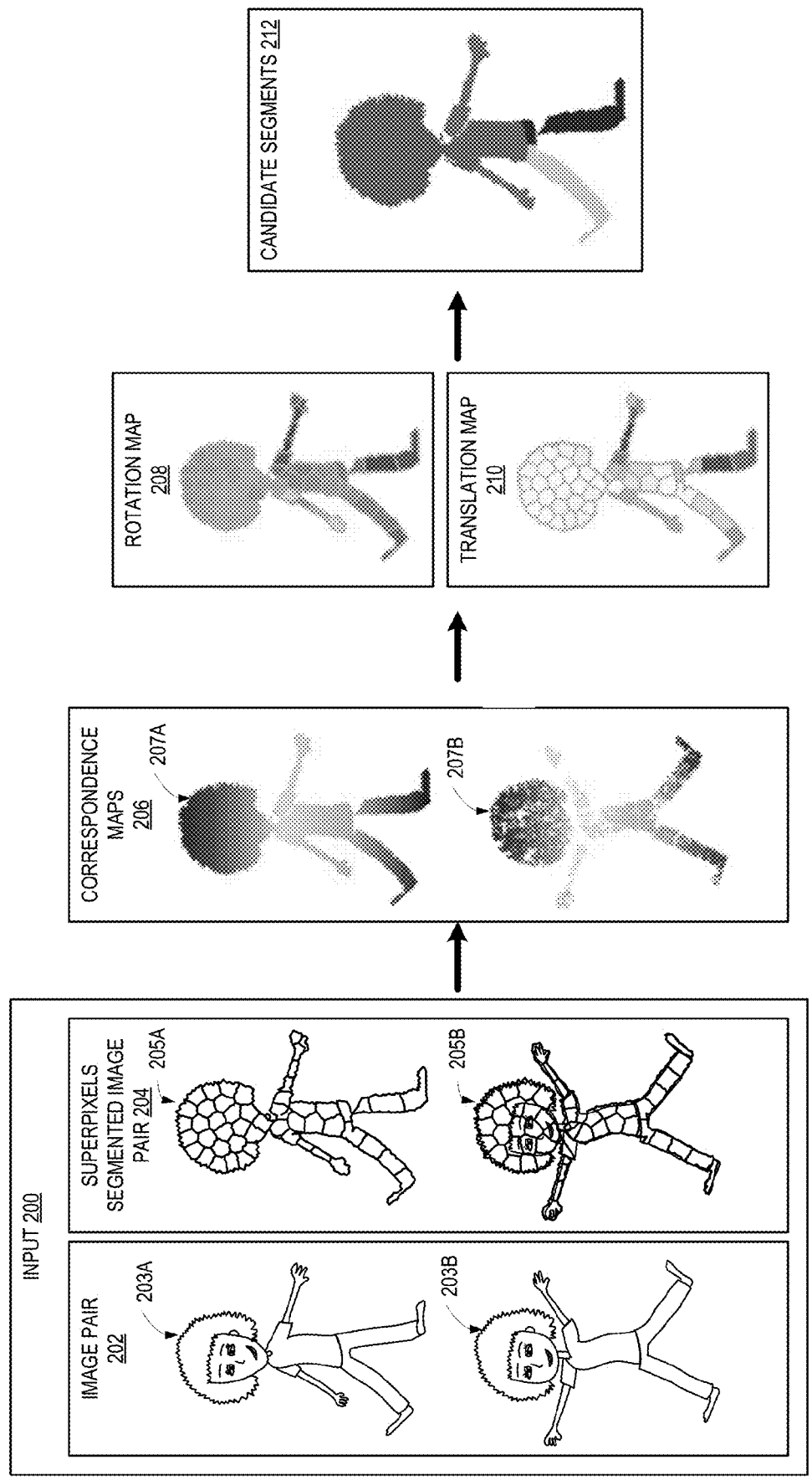
FIG. 2 illustrates an exemplary image pair being processed through a correspondence module and a clustering module in accordance with one or more embodiments.

FIG. 2 illustrates an exemplary image pair being processed through a correspondence module and a clustering module in accordance with one or more embodiments. FIG. 2 depicts an input 200 that includes an image pair 202 (e.g., two different poses of an animated character selected from images 106 and paired by the image processing module 108). In the example of FIG. 2, the top pose of image pair 202 is the source image 203A and the bottom pose is the target image 203B. In other embodiments, the order of the source and target images can be reversed. After sending the image pair 202 to a correspondence module (e.g., correspondence module 112), the correspondence module predicts pixel correspondence data indicating corresponding pixels from the source image 203A to the target image 203B. FIG. 2 depicts correspondence maps 206 generates from the pixel correspondence data, where pixels of the same color between the pixel correspondence map for the source image 207A and the pixel correspondence map for the source image 207B have been predicted to be corresponding pixels based on their feature vectors.

Returning to FIG. 1, after the correspondence module 112 generates the pixel correspondence data 114, the pixel correspondence data 114 is sent to a clustering module 116, as shown at numeral 7. In one or more embodiments, the clustering module 116 determines pixels with similar motion patterns and groups them into a set of candidate articulating parts or segments (e.g., candidate segments 118), at numeral 8. In one or more embodiments, the clustering module 116 is a trained neural network. The clustering module 116 can use the pixel correspondence data 114 between the first image (e.g., source image) and the second image (e.g., target image) to determine segments of the animated character by grouping pixels with similar motion transformations. In one or more embodiments, using the pixel correspondence data 114, the clustering module 116 gathers votes for two transformation components, two-dimensional rotation and translation, from pairs of corresponding points $(x_1, x'_1)$ and $(x_2, x'_2)$, where $x_1$ and $x_2$ are pixels in the first image, and $x'_1$ and $x'_2$ are the corresponding pixels in the second image (e.g., based on the pixel correspondence data 114). In some embodiments, the rotation and translation components are extracted sequentially. Extracting rotation and translation components sequentially can prevent the extracted translation from dominating the extracted rotation, which can result from extracting the translation and the rotation simultaneously.

In one or more embodiments, because gathering votes from correspondences of all possible pixel pairs can be computationally and resource intensive, and because pixel pairs that are a large distance apart are more likely to be from different segments, the clustering module 116 may not select all possible pixel pairs as the voting pairs. For example, to accelerate the computation, instead of gathering votes from correspondences of all possible pixel pairs, the clustering module 116 uses a superpixel segmented version of the images. In one or more embodiments, the superpixel segmented versions of the images can be provided in the input 200. In other embodiments, they can be generated by the digital design system 102 (e.g., by the image processing module 108 or by another module). In either embodiment, a superpixel segmentation algorithm that groups pixels into regions can be used to generate the superpixel segmented versions of the images. Continuing the example in FIG. 2, a superpixel segmentation algorithm can generate superpixels segmented image pair 204, including superpixel segmented source image 205A and superpixel segmented target image 205B. As illustrated, application of a superpixel algorithm results in the poses of the animated character in the superpixels segmented image pair 204 being split into a plurality of smaller portions. Each portion represents a superpixel, where the pixels that are in a same superpixel share the same or similar motion transformations. In one or more embodiments, the number of voting pairs per superpixel is equal to the number of pixels in that superpixel. Each voting pair includes a pixel, p, and the center of the superpixel that pixel p belongs to.

In one or more embodiments, to extract the rotation from corresponding pairs of pixels (e.g., the voting pairs), the clustering module 116 uses a convnet approach that learns to estimate the transformations from approximate correspondences. The input to the clustering module 116 is a map storing the voting pairs. Specifically, for each first image pixel $x_1$, the clustering module 116 stores the 2D vector $x_1 - x_c$, representing its relative position with respect to its superpixel centroid $x_c$, and also the corresponding 2D vector $x'_1 - x'_c$, representing the relative position of corresponding second image pixel $x'_1$ with respect to its superpixel centroid $x'_c$. This results in an H×W×4 input voting map. Pixels without any correspondences can be indicated by an additional binary mask. The voting map and binary mask map are processed through a U-Net backbone and gated convolutions similar to the convnet of the correspondence module 112. The output is an H×W×64 feature map representing motion features per pixel in the first image. Average pooling is spatially applied over each superpixel area to acquire motion feature $\mathbb{R}^{K_s \times 64}$, for all $K_s$ superpixels. A multilayer perceptron (MLP) layer can then be applied to map the feature to $\mathbb{R}^{K_s \times 2}$ space, representing sine and cosine of the rotation angles for $K_s$ superpixels. The output of the translation extraction process is a rotation matrix.

In one or more embodiments, to extract the translation from corresponding pairs of pixels (e.g., the voting pairs), the clustering module 116 uses the same network architecture and process used to extract the rotation, as described above. In one or more embodiments, the voting pairs used to extract the translation are modified to remove the rotation component. In some embodiments, the rotation component can removed by multiplying the rotation matrix to the coordinates of the pixels in the corresponding superpixel. In such embodiments, after removing the rotation component from the voting pairs, the remaining transformation from $x_1 - x_c$ to $x'_1 - x'_c$ will be mostly translation-related. The output of the translation extraction process is a translation matrix.

Given extracted rotation and translation matrices for each superpixel, the clustering module 116 then determines their motion similarity, or affinity. In one or more embodiments, the affinity can be computed based on motion residuals. The clustering module 116 applies the estimated rotation and translation of each superpixel to transform all other superpixels and computes the position difference between the transformed superpixels and their corresponding superpixels. For example, given a superpixel $p_i$, with an estimated rotation matrix $R_s[i]$ and translation matrix $t_s[i]$, the motion residual for the superpixel $p_j$ can be represented as:

$$D_s(i, j) = \frac{\sum_{x \in p_j} (R_s[i] \cdot x + t_s[i] - x')}{|p_j|}$$

where $|p_j|$ is the number of pixels in the superpixel $p_j$. The motion residual matrix $D_s \in \mathbb{R}^{K_s \times K_s \times 2}$ is processed through another MLP layer to compute the superpixel affinity matrix, $A_s \in \mathbb{R}^{K_s \times K_s}$. Spectral clustering is then applied to the affinity matrix, $A_s$, resulting in matrix $G_s \in \mathbb{R}^{K_s \times C_s}$ which represents a soft membership of superpixels to $C_s$ clusters. In one or more embodiments, the number of clusters is set based on the number of eigenvalues extracted from spectral clustering larger than a threshold. In one embodiment, the threshold is set as 1% of the sum of the first ten eigenvalues. By converting the soft membership to a hard one, the resulting clusters represent candidate segments 118 for the first image (e.g., the source image) based on its paired second image (e.g., the target image). This process described in numerals 6-8 is repeated for each pair of image in image pairs 110.

Continuing the example of FIG. 2, rotation map 208 depicts the extracted rotation transformation data and translation map 210 depicts the extracted translation transformation data generated by a clustering module (e.g., clustering module 116) using pixel correspondence data received from the correspondence module. As described previously, the pixels within a same superpixel are assumed to have the same or similar motion transformations. Superpixels with same or similar motion transformations can then be grouped together based on their motion similarity, or affinity. As illustrated in FIG. 2, superpixels in the rotation map 208 and the translation map 210 with the same or similar motion transformations can be identified with the same or similar color. Using the data in the rotation map 208 and the translation map 210, the clustering module generates the candidate segments 212, where each segment is denoted by a different color in FIG. 2. For example, candidate segments 212 has segmented a head segment, a torso segment, two arm segments, and two leg segments from source image 203A.

Returning to FIG. 1, after the clustering module 116 generates the candidate segments 118 for all the image pairs 110, the candidate segments 118 for all the image pairs 110 are sent to a segment selecting module 120, as shown at numeral 9. In one or more embodiments, the segment selecting module 120 determines selected segments 122 of the animated character that best reconstruct the poses in the input 100 using the candidate segments 118, at numeral 10. The candidate segments 118 yields a mixture of segments $Q=\{q_1, q_2, \ldots, q_c\}$, scattered from the plurality of poses from images 106, where $C=\Sigma_s C_s$ is the total number. In one or more embodiments, the segment selecting module 120 selects selected segments 122 that can reconstruct all poses in the input 100 with minimal reconstruction error, while also have a minimum overlap with each other. In one or more embodiments, the segment selecting module 120 formulates a set cover optimization problem where the smallest subset of segments covers a universe $P=\{p_i\}$ of all the superpixels across all poses. In some embodiments, by introducing a binary variable z, indicating whether a segment $q_c$ belongs to the optimal set (the "set cover") or not, the optimization problem can be expressed as follows:

$$\min \sum_{q_c \in Q} z_c$$

$$\text{s.t.} \sum_{q_c: p_i \in q_c} z_c \geq 1 \text{ for all } p_i \in P$$

In one or more embodiments, using the above, the number of the selected segments 122 can be minimized. The above integer linear programming problem can be solved through relaxation. This yields a continuous linear programming problem solved using the interior point method. A randomized-rounding algorithm is then applied to convert the continuous result to the desired binary predictions. The randomized-rounding algorithm can provide multiple possible solutions. The quality of the multiple solutions can be measured by deforming the selected segments in each solution to best reconstruct all the given poses in the input 100. In one or more embodiments, the deformation is based on as-rigid-as-possible (ARAP) surface modeling. The solution with the smallest reconstruction error can then be selected as the selected segments 122.

Figure 3:
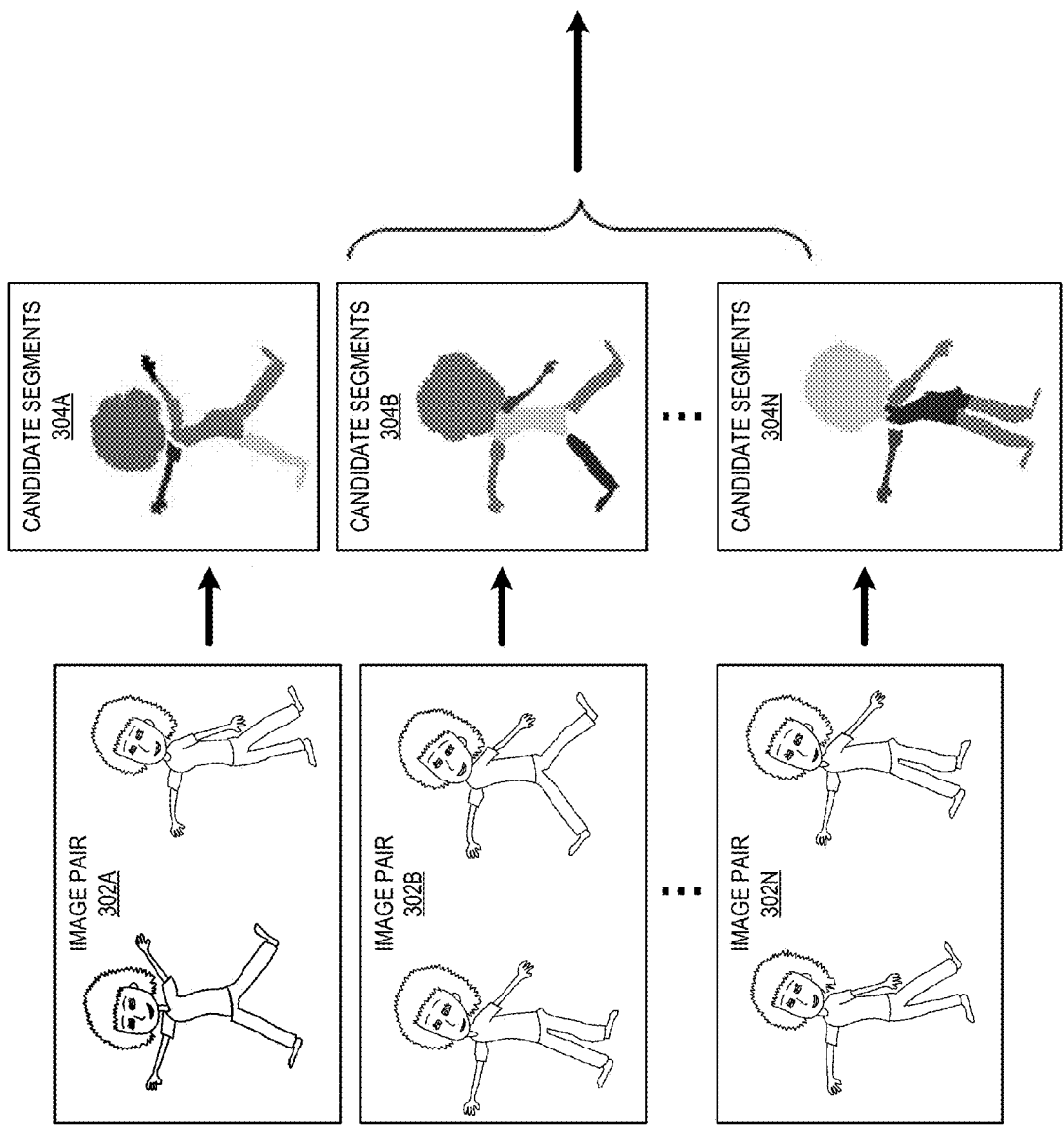
FIG. 3 illustrates example outputs of a process of generating segments for an animated character rig from sprite sheets in accordance with one or more embodiments.

FIG. 3 illustrates example outputs of a process of generating segments for an animated character rig from sprite sheets in accordance with one or more embodiments. As illustrated, after processing a plurality of image pairs (e.g., 302A, 302B, and 302N) through a correspondence module and a clustering module, candidate segments 304A-N, respectively, are determined. The candidate segments 304A-N are then sent to a segment selecting module (e.g., segment selecting module 120), which formulates a set cover optimization problem to select segments from the candidate segments 304A-N that best reconstruct all the given poses in the image pairs 302A-N with the smallest reconstruction error.

Returning to FIG. 1, in one or more embodiments, the digital design system 102 provides an output 130, including the selected segments 122, as shown at numeral 11. In one or more embodiments, after the process described above in numerals 1-10 the output 130 is sent to the user or computing device that initiated the articulated part extraction process with the digital design system 102, to another computing device associated with the user or another user, or to another system or application. For example, after the process described above in numerals 1-10, the selected segments 122 and/or a character rig constructed from the selected segments 122 can be displayed in a user interface of a computing device.

FIG. 4 illustrates an example input to a digital design system (e.g., digital design system 102) and output of an articulated part extraction process in accordance with one or more embodiments. The input 400 is a sprite sheet that includes eight different poses of an animated character. Other example sprite sheet images can include a greater or smaller number of poses. Using the process described above, the digital design system 102 generates selected segments 402 that can be used to generate a character rig for the animated character. Using the character rig, the animated character can be manipulated into a plurality of different poses, including poses in the sprite sheet provided as input 400 and additional poses not included in the sprite sheet, including example pose 404.

Figure 5:
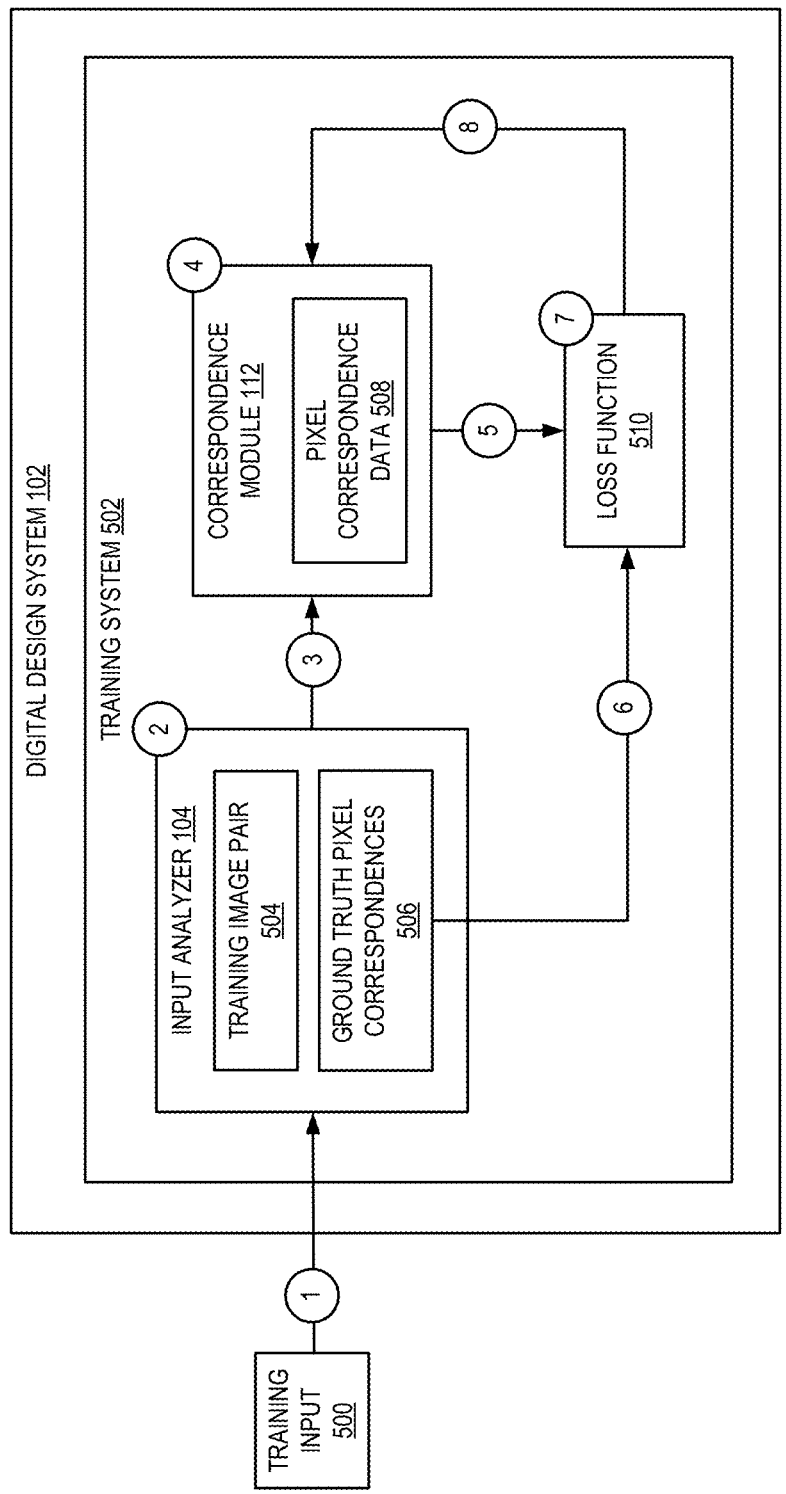
FIG. 5 illustrates a diagram of a training system for training a machine learning model to generate pixel correspondence data between images in accordance with one or more embodiments.

FIG. 5 illustrates a diagram of a training system for training a machine learning model to generate pixel correspondence data between images in accordance with one or more embodiments. In one or more embodiments, a training system 502 is configured to train a neural network (e.g., correspondence module 112) to generate pixel correspondence data based on training inputs (e.g., training pairs of images of an animated character in different poses), and their corresponding ground truth pixel correspondences. Although the training system 502 is depicted as part of digital design system 102, in various embodiments, training system 502 can be a standalone system or a separate system implemented on electronic devices separate from the electronic devices implementing digital design system 102. In such embodiments, the training system 502 can be deployed to the digital design system 102.

As shown in FIG. 1, the training system 502 receives a training input 500, as shown at numeral 1. For example, the digital design system 102 receives the training input 500 from a user via a computing device or from a memory or storage location. In one or more embodiments, the training input 500 includes a training image pair 504 and ground truth pixel correspondences 506 for the training image pair 504. The training input 500 can include multiple training image pairs and ground truth pixel correspondence data that can be fed to the training system 502 in parallel or in series.

In one or more embodiments, the digital design system 102 includes an input analyzer 104 that receives the training input 500. In some embodiments, the input analyzer 104 analyzes the training input 500, at numeral 2. In some embodiments, the input analyzer 104 analyzes the training input 500 to identify the training image pair 504 and the ground truth pixel correspondences 506 for the training image pair 504. In one or more embodiments, the input analyzer 104 sends the training image pair 504 to a correspondence module 112, as shown at numeral 3.

In one or more embodiments, the correspondence module 112 determines the pixel correspondence data 508 for the training image pair 504, at numeral 4. In one or more embodiments, the correspondence module 112 is a trained neural network. In one or more embodiments, a neural network includes deep learning architecture for learning representations of images. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

In one or more embodiments, pixel correspondence data 508 determined by the correspondence module 112 captures the candidate motions of pixels from a first image (e.g., a source image, $I_s$) of the training image pair 504 to a second image (e.g., a target image, $I_t$) of the training image pair 504. In one or more embodiments, given a pair of images $I_s$, $I_t$ and corresponding binary foreground masks $M_s$, $M_t$ from the training image pair 504, the correspondence module 112 predicts the candidate motion mapping of foreground pixels between the two images. For example, for each pixel in the first image, the correspondence module 112 predicts the closest pixels in the second image, based on pixel features. In some embodiment, the correspondence module 112 first concatenates each image of the training image pair 504 and masks and transforms them into a feature map, $F_s \in \mathbb{R}^{H \times W \times 64}$ using a convnet. In one embodiment, the neural network of the correspondence module 112 follows a U-Net architecture and includes ten convolutional layers in its encoder and another ten layers in its decoder. The convolutional layers in the encoder implement gated convolution, which offers a gating mechanism such that the background pixels indicated by the masks are prevented from influencing the foreground pixel correspondences. The feature vector of each pixel is further normalized according to its L2 norm to acquire a unit-length feature vector.

For each foreground pixel x=(x,y) in the first image $I_s$ of the training image pair 504, a corresponding pixel x'=(x',y') in the second image $I_t$ of the training image pair 504 can be identified as the pixel with the most similar feature vector in terms of cosine similarity. In one or more embodiments, during training, the "arg max" of the cosine similarity equation, described with respect to FIG. 1, is replaced with a soft version to preserve differentiability. Specifically, the "arg max" is replaced with the weighted average of the top-x closest target image foreground pixels to each source image pixel, resulting in the following equation:

$$x' = \sum_{u_k \in U(x)} \langle F_s(x) \cdot F_t(u_k) \rangle \cdot u_k$$

where U(x) represent the most similar target pose pixels to x using cosine similarity. The closest pixels are updated after each forward pass through the network.

In one or more embodiments, the correspondence module 112 sends the pixel correspondence data 508 to a loss function 510, as shown at numeral 5. The loss function 510 can also receive the ground truth pixel correspondences 506 (e.g., received in the training input 500), as shown at numeral 6. The loss function 510 uses the ground truth pixel correspondences 506 and the pixel correspondence data 508 to calculate a loss, at numeral 7. In one or more embodiments, the correspondence module 112 is trained through a contrastive learning approach with the supervision of the pixel correspondences from the pixel correspondence data 508. Specifically, given a pair of input images $I_s$, $I_t$, the InfoNCE loss is minimized to encourage the representation of ground-truth corresponding pixel pairs (x, x') (e.g., from the ground truth pixel correspondences 506) to be more similar than non-corresponding pixel pairs using the following equation:

$$L_{x,x'}^{(corr)} = -\log \frac{\exp(x \cdot x'/\tau)}{\sum_{u \in U_t} \exp(x \cdot u/\tau)}$$

where $U_t$ is a predefined number of pixels randomly sampled from the foreground region of the image $I_t$ indicated by its mask $M_t$. In one or more embodiments, the value of $U_t$ is set to 1024. The temperature $\tau$ is used to scale the cosine similarities. In some embodiment, the value of $\tau$ is initially set as 0.07, and is learned simultaneously as the correspondence module 112 is trained. In one or more embodiments, the total correspondence loss, $L_c$, is averaged over corresponding pairs of pixels from the pixel correspondence data 508 over a plurality of training pairs. The loss calculated using the loss function 510 can then be backpropagated to the correspondence module 112, as shown at numeral 8.

Figure 6:
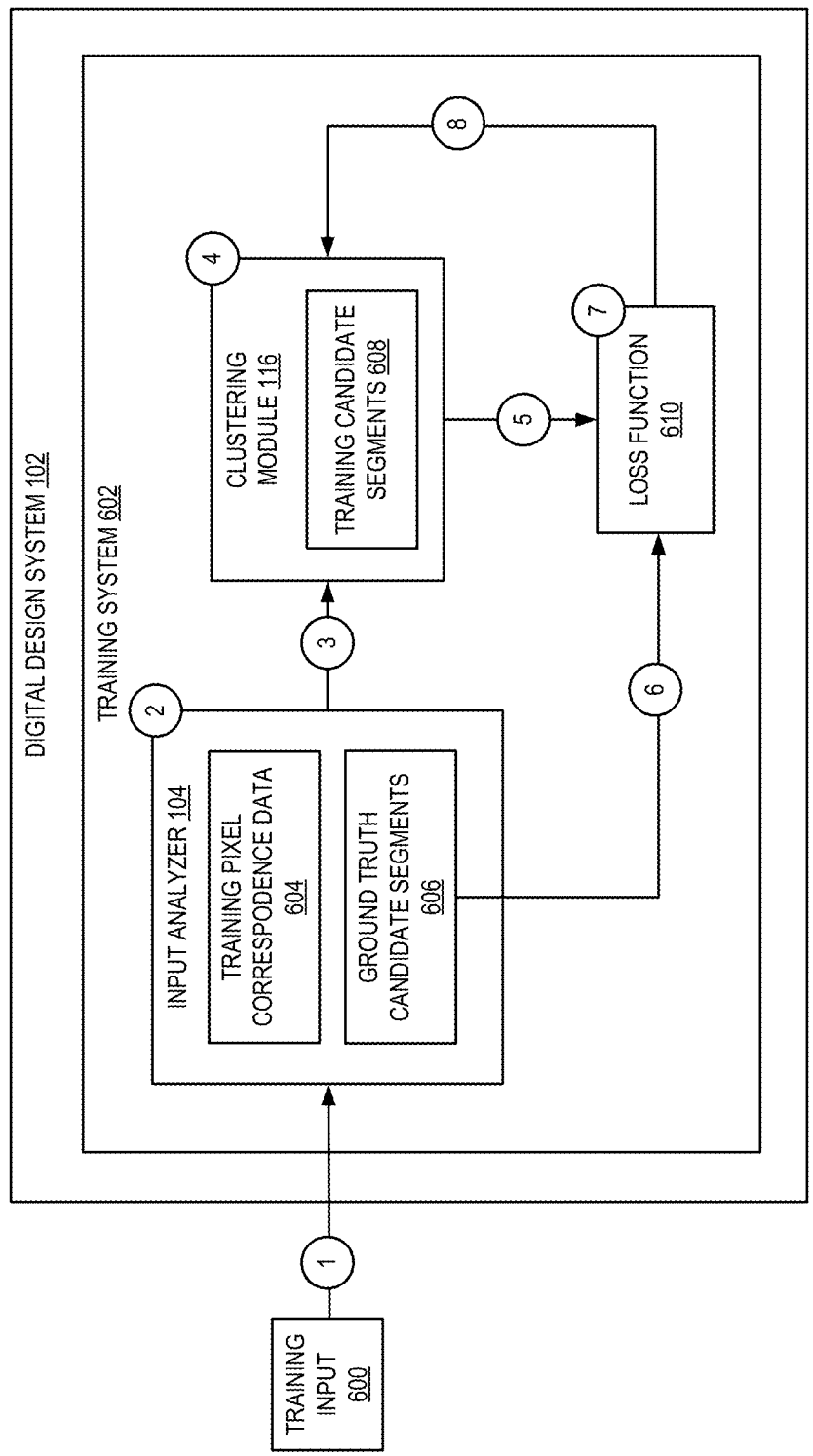
FIG. 6 illustrates a diagram of a training system for training a machine learning model to generate candidate segments from pixel correspondence data in accordance with one or more embodiments.

FIG. 6 illustrates a diagram of a training system for training a machine learning model to generate candidate segments from pixel correspondence data in accordance with one or more embodiments. In one or more embodiments, a training system 602 is configured to train a neural network (e.g., clustering module 116) to generate candidate segments based on training inputs (e.g., training pixel correspondence data from an image pair, or multiple image pairs, of an animated character in different poses), and their corresponding ground truth candidate segments. Although the training system 602 is depicted as part of digital design system 102, in various embodiments, training system 602 can be a standalone system or a separate system implemented on electronic devices separate from the electronic devices implementing digital design system 102. In such embodiments, the training system 602 can be deployed to the digital design system 102.

As shown in FIG. 1, the training system 602 receives a training input 600, as shown at numeral 1. For example, the digital design system 102 receives the training input 600 from a user via a computing device or from a memory or storage location. In one or more embodiments, the training input 600 includes a training pixel correspondence data 604 and ground truth candidate segments 606 for the training pixel correspondence data 604. The training input 600 can include training pixel correspondence data 604 and ground truth candidate segments 606 corresponding to multiple training image pairs that can be fed to the training system 602 in parallel or in series.

In one or more embodiments, the digital design system 102 includes an input analyzer 104 that receives the training input 600. In some embodiments, the input analyzer 104 analyzes the training input 600, at numeral 2. In some embodiments, the input analyzer 104 analyzes the training input 600 to identify the training pixel correspondence data 604 and the ground truth candidate segments 606 corresponding to the training pixel correspondence data 604. In one or more embodiments, the input analyzer 104 sends the training pixel correspondence data 604 to a clustering module 116, as shown at numeral 3.

In one or more embodiments, using the training pixel correspondence data 604, the clustering module 116 determines pixels with similar motion patterns and groups them into a set of candidate articulating parts or segments (e.g., training candidate segments 608), at numeral 4. In one or more embodiments, the clustering module 116 is a trained neural network. In one or more embodiments, a neural network includes deep learning architecture for learning representations of images. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

In one or more embodiments, using the training pixel correspondence data 604, the clustering module 116 gathers votes for two types of transformations, two-dimensional rotation and translation, from pairs of corresponding points $(x_1, x'_1)$ and $(x_2, x'_2)$, where $x_1$ and $x_2$ are pixels in a first training image of a training pair, and $x'1$ and $x'2$ are their correspondences in a second training image of the training pair. In some embodiments, because gathering votes from correspondences of all possible pixel pairs can be computationally expensive and because pixel pairs that are a large distance apart are more likely to be from different segments, the clustering module 116 may not select all possible pixel pairs as the voting pairs. For example, to accelerate the computation, instead of gathering votes from correspondences of all possible pixel pairs, the clustering module 116 uses a superpixel segmentation method or algorithm, which group pixels together into superpixel groups, where pixels within a same superpixel are assumed to share the same or similar motion transformations.

In one or more embodiments, the clustering module 116 extracts the rotation data and translation data from corresponding pairs of pixels (e.g., the voting pairs), as described with respect to FIG. 1. Given extracted rotations and translations for each superpixel, the clustering module 116 then determines their motion similarity, or affinity. In one or more embodiments, the affinity can be computed based on motion residuals. The clustering module 116 applies the estimated rotation and translation of each superpixel to transform all other superpixels and computes the position difference between the transformed superpixels and their corresponding superpixels. For example, given a superpixel $p_i$, with an estimated rotation matrix $R_s[i]$ and translation matrix $t_s[i]$, the motion residual for the superpixel $p_j$ can be represented as:

$$D_s(i,j) = \frac{\sum_{x \in p_j}(R_s[i] \cdot x + t_s[i] - x')}{|p_j|}$$

where $|p_j|$ is the number of pixels in the superpixel $p_j$. The motion residual matrix $D_s \in \mathbb{R}^{K_s \times K_s \times 2}$ is processed through another MLP layer to compute the superpixel affinity matrix, $A_s \in \mathbb{R}^{K_s \times K_s}$ Spectral clustering is then applied to the affinity matrix, $A_s$, resulting in matrix $G_s \in \mathbb{R}^{K_s \times C_s}$ representing a soft membership of superpixels to $C_s$ clusters. In one or more embodiments, the number of clusters is set based on the number of eigenvalues extracted from spectral clustering larger than a threshold. In one embodiment, the threshold is set as 1% of the sum of the first ten eigenvalues. By converting the soft membership to a hard one, the resulting clusters represent training candidate segments 608 for the first image (e.g., the source image) based on its paired second image (e.g., the target image).

In one or more embodiments, the clustering module 116 sends the training candidate segments 608 to a loss function 610, as shown at numeral 5. The loss function 610 can also receive the ground truth candidate segments 606 (e.g., received in the training input 600), as shown at numeral 6. The loss function 610 uses the ground truth candidate segments 606 and the training candidate segments 608 to calculate a loss, at numeral 7. In one or more embodiments, the clustering module 116 is trained with the binary cross-entropy (BCE) loss over the supervision of ground-truth affinity matrix $A_s^{gt}(i,j)$, with the following:

$$L_s^{(aff)} = BCE(A_s, A_s^{gt})$$

An additional loss on the motion residual matrix, $D_s$, can also be introduced to encourage consistent rigid transformation predictions across superpixels of the same segment, using the following:

$$L_s^{(motion)} = \frac{\sum_{i,j}[A_s^{gt}(i,j) = 1]\cdot\|D_s(i,j)\|^2}{\sum_{i,j}[A_s^{gt}(i,j) = 1]}$$

where [•] is an indicator function.

A soft Intersection over Union (IoU) loss can also be adopted to push the clustering memberships of superpixels in matrix $G_s$ to be as similar as possible to the clustering memberships of superpixels in the ground truth matrix, $G_s^{gt}$, using the following:

$$L_s^{(clust)} = \sum_{c=1}^{C_s^{(gt)}} \frac{\langle g_c, g_{\mathcal{H}(c)}^{gt}\rangle}{\|g_c\|_1 + \|g_{\mathcal{H}(c)}^{gt}\|_1 - \langle g_c, g_{\mathcal{H}(c)}^{gt}\rangle}$$

where $g_c$ and $g_c^{gt}$ represent the column of the $G_s$ and $G_s^{gt}$ matrices, respectively, $C_s^{gt}$ is the total number of parts in the ground-truth, and $\mathcal{H}$ (c) represents the matched column index c of predicted cluster to the ground-truth cluster based on Hungarian matching. The losses calculated using the loss function 610 can then be backpropagated to the clustering module 116, as shown at numeral 8.

Figure 7:
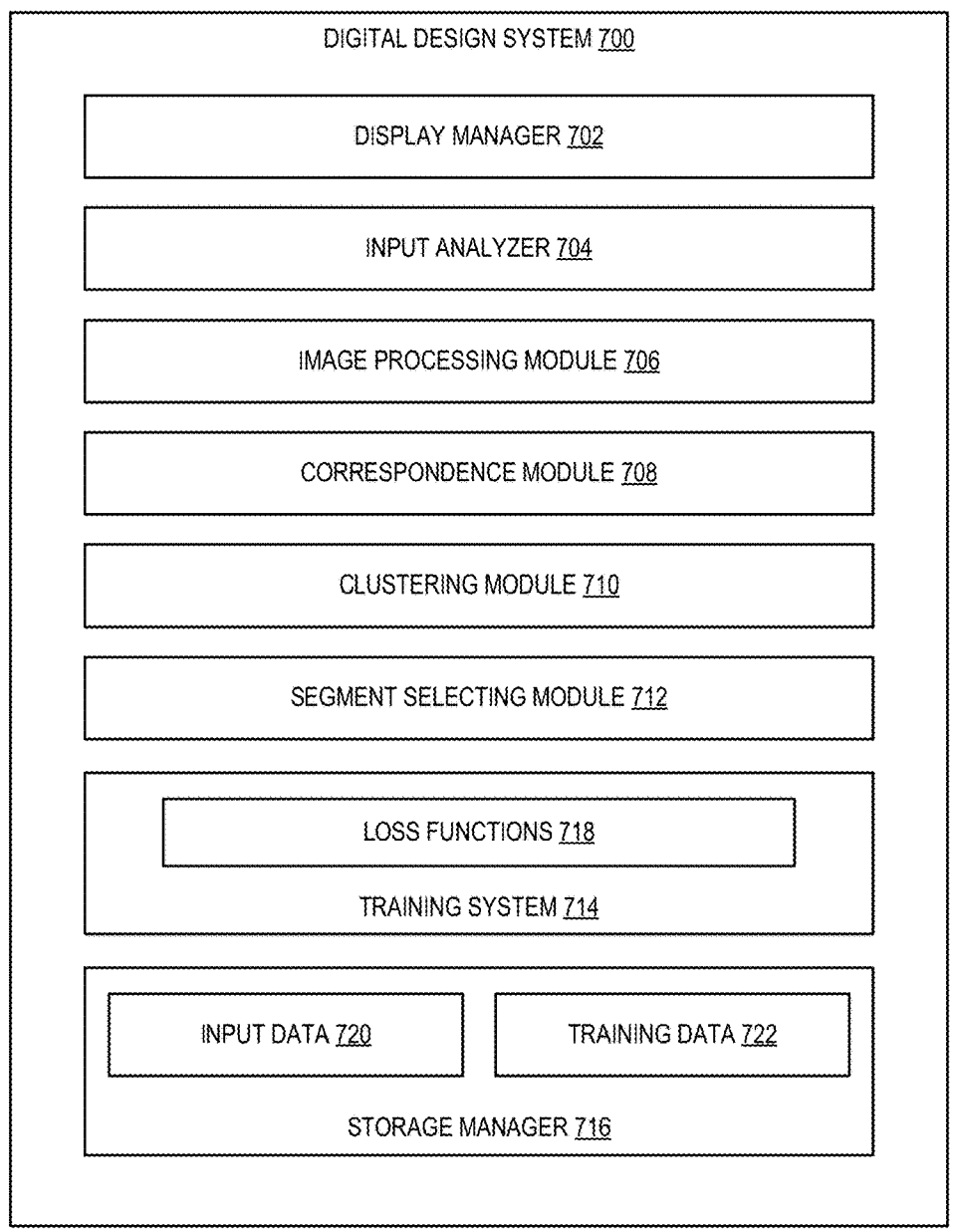
FIG. 7 illustrates a schematic diagram of a digital design system in accordance with one or more embodiments.

FIG. 7 illustrates a schematic diagram of a digital design system (e.g., "digital design system" described above) in accordance with one or more embodiments. As shown, the digital design system 700 may include, but is not limited to, a display manager 702, an input analyzer 704, an image processing module 706, a correspondence module 708, a clustering module 710, a segment selecting module 712, a training system 714, and a storage manager 716. As shown, the training system 714 includes loss functions 718. The storage manager 716 includes input data 720 and training data 722.

As illustrated in FIG. 7, the digital design system 700 includes a display manager 702. In one or more embodiments, the display manager 702 identifies, provides, manages, and/or controls a user interface provided on a touch screen or other device. Examples of displays include interactive whiteboards, graphical user interfaces (or simply "user interfaces") that allow a user to view and interact with content items, or other items capable of display on a touch screen. For example, the display manager 702 may identify, display, update, or otherwise provide various user interfaces that include one or more display elements in various layouts. In one or more embodiments, the display manager 702 can identify a display provided on a touch screen or other types of displays (e.g., including monitors, projectors, headsets, etc.) that may be interacted with using a variety of input devices. For example, a display may include a graphical user interface including one or more display elements capable of being interacted with via one or more touch gestures or other types of user inputs (e.g., using a stylus, a mouse, or other input devices). Display elements include, but are not limited to buttons, text boxes, menus, thumbnails, scroll bars, hyperlinks, etc.

As further illustrated in FIG. 7, the digital design system 700 also includes an input analyzer 704. The input analyzer 704 analyzes an input received by the digital design system 700 to identify different poses of an animated character in the received sprite sheet. In one or more embodiments, the input analyzer 704 generates image pairs by selecting two different poses from the sprite sheet. In some embodiments, the input analyzer 704 generates all possible image pairs from the sprite sheet. In other embodiments, the input analyzer 704 generates only a subset of all possible image pairs from the sprite sheet.

As further illustrated in FIG. 7, the digital design system 700 also image processing module 706. The image processing module 706 is configured to generate image pairs from a sprite sheet image that includes a plurality of different poses of an animated character. Each image pair created by the image processing module 706 includes a pair of different poses from the sprite sheet image. In some embodiments, the image processing module 706 generates all pair combinations from the poses in the sprite sheet image. For example, given a sprite sheet image that includes eight images of an animated character in a plurality of different poses, the image processing module 706 can generate up to 28 different pairs of poses as the image pairs. In other embodiments, the image processing module 706 generates less than all possible pair combinations.

As further illustrated in FIG. 7, the digital design system 700 also includes correspondence module 708 configured to determine pixel correspondence data for each pair of the image pairs generated by the image processing module 108. The correspondence module 708 can be implemented as, or include, one or more machine learning models, such as a neural network or a deep learning model. In one or more embodiments, the neural network of the correspondence module 708 is trained to predict the correspondence of pixels between a source image and a target image of an image pair.

As further illustrated in FIG. 7, the digital design system 700 also includes a clustering module 710 configured to determine pixels with similar motion patterns and groups them into a set of candidate articulating parts or segments. The clustering module 710 can be implemented as, or include, one or more machine learning models, such as a neural network or a deep learning model. In one or more embodiments, the neural network of the clustering module 710 is trained to predict articulated segments of an animated character by clustering pixels of an image pair using pixel correspondence data generated by the correspondence module 708.

As further illustrated in FIG. 7, the digital design system 700 also includes a segment selecting module 712. The segment selecting module 712 selects segments of the animated character from the candidate segments generated by the clustering module 710. The segment selecting module 712 selects the segments from the candidate segments that best reconstruct the different poses in the input sprite sheet image the produce the lowest reconstruction error.

As further illustrated in FIG. 7, the digital design system 700 includes training system 714 which is configured to teach, guide, tune, and/or train one or more neural networks. In particular, the training system 714 trains neural networks, such as correspondence module 708 and clustering module 710, based on training data and using loss functions 718.

As further illustrated in FIG. 7, the storage manager 716 includes input data 720 and training data 722. In particular, the input data 720 may include sprite sheet (e.g., an image of file containing multiple different poses of an animated character) received by the digital design system 700. In one or more embodiments, the training data 722 may include training sprite sheets, training image pairs from the training sprite sheet, ground truth pixel correspondences and ground truth candidate segments that can be used during a training process of the digital design system 700 to train neural networks (e.g., correspondence module 708 and clustering module 710).

Each of the components 702-716 of the digital design system 700 and their corresponding elements (as shown in FIG. 7) may be in communication with one another using any suitable communication technologies. It will be recognized that although components 702-716 and their corresponding elements are shown to be separate in FIG. 7, any of components 702-716 and their corresponding elements may be combined into fewer components, such as into a single facility or module, divided into more components, or configured into different components as may serve a particular embodiment.

The components 702-716 and their corresponding elements can comprise software, hardware, or both. For example, the components 702-716 and their corresponding elements can comprise one or more instructions stored on a computer-readable storage medium and executable by processors of one or more computing devices. When executed by the one or more processors, the computer-executable instructions of the digital design system 700 can cause a client device and/or a server device to perform the methods described herein. Alternatively, the components 702-716 and their corresponding elements can comprise hardware, such as a special purpose processing device to perform a certain function or group of functions. Additionally, the components 702-716 and their corresponding elements can comprise a combination of computer-executable instructions and hardware.

Furthermore, the components 702-716 of the digital design system 700 may, for example, be implemented as one or more stand-alone applications, as one or more modules of an application, as one or more plug-ins, as one or more library functions or functions that may be called by other applications, and/or as a cloud-computing model. Thus, the components 702-716 of the digital design system 700 may be implemented as a stand-alone application, such as a desktop or mobile application. Furthermore, the components 702-716 of the digital design system 700 may be implemented as one or more web-based applications hosted on a remote server. Alternatively, or additionally, the components of the digital design system 700 may be implemented in a suit of mobile device applications or "apps."

Figure 8:
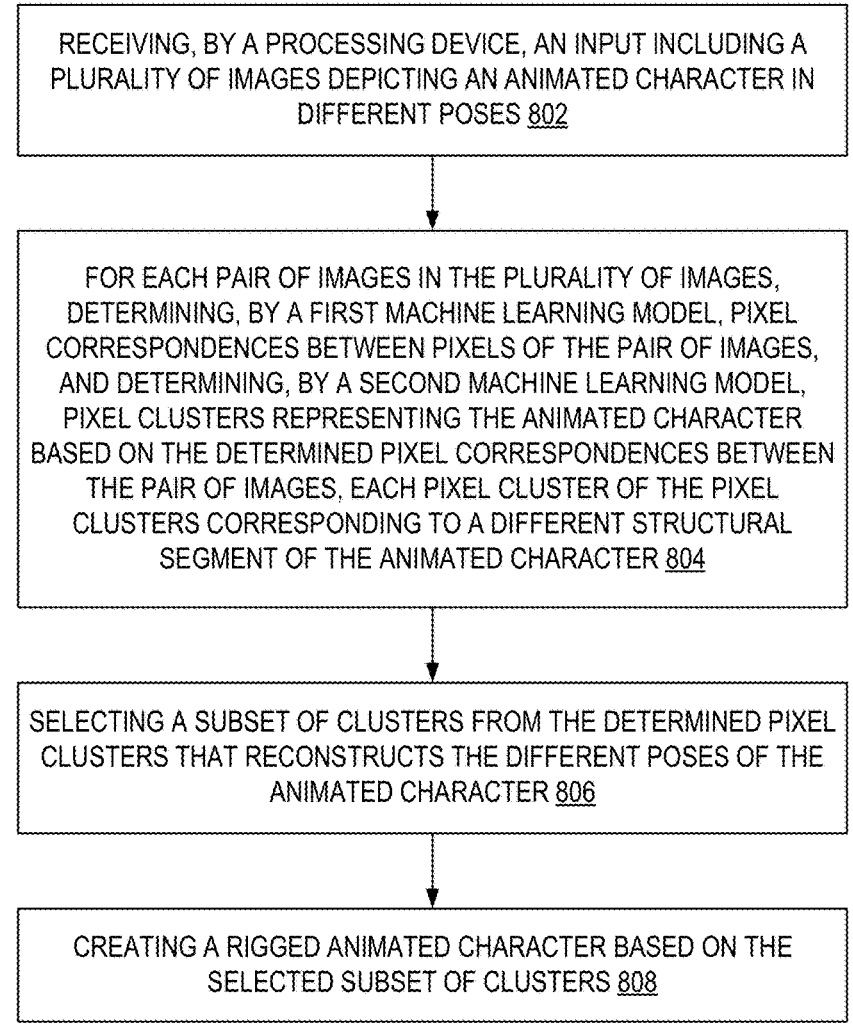
FIG. 8 illustrates a flowchart of a series of acts in a method of performing articulated part extraction of animated characters from sprite sheets by a digital design system in accordance with one or more embodiments.

FIGS. 1-7, the corresponding text, and the examples, provide a number of different systems and devices that allow a digital design system to extract articulated parts for an animated character from poses provided in a sprite sheet. In addition to the foregoing, embodiments can also be described in terms of flowcharts comprising acts and steps in a method for accomplishing a particular result. For example, FIG. 8 illustrates a flowchart of an exemplary method in accordance with one or more embodiments. The method described in relation to FIG. 8 may be performed with less or more steps/acts or the steps/acts may be performed in differing orders. Additionally, the steps/acts described herein may be repeated or performed in parallel with one another or in parallel with different instances of the same or similar steps/acts.

FIG. 8 illustrates a flowchart of a series of acts in a method of performing articulated part extraction of animated characters from sprite sheets by a digital design system in accordance with one or more embodiments. In one or more embodiments, the method 800 is performed in a digital medium environment that includes the digital design system 700. The method 800 is intended to be illustrative of one or more methods in accordance with the present disclosure and is not intended to limit potential embodiments. Alternative embodiments can include additional, fewer, or different steps than those articulated in FIG. 8.

As shown in FIG. 8, the method 800 includes an act 802 of receiving, by a processing device, an input including a plurality of images depicting an animated character in different poses. In one or more embodiments, the input includes at least a sprite sheet image that includes a plurality of images of an animated character, where each image depicts the animated character in a different pose. In one or more embodiments, the digital design system receives the input from a user (e.g., via a computing device). In one or more embodiments, the user may select the sprite sheet image in an application, or the user may submit the sprite sheet image to a web service or an application configured to receive inputs.

As shown in FIG. 8, the method 800 also includes an act 804 of, for each pair of images in the plurality of images, determining, by a first machine learning model, pixel correspondences between pixels of the pair of images, and determining, by a second machine learning model, pixel clusters representing the animated character based on the determined pixel correspondences between the pair of images. Each pixel cluster of the pixel clusters corresponds to a different structural segment of the animated character (e.g., head, arm, torso, legs, etc.).

In one or more embodiments, the first machine learning model is trained to determine the pixel correspondences between the pixels of the pair of images includes generating a preprocessed image by concatenating a first image from the pair of images with a second image from the pair of images. The processing device then generates a feature map of the preprocessed image, where each feature vector of the generated feature map corresponds to a pixel of the preprocessed image. The feature vectors associated with pixels of the first image and the feature vectors associated with pixels of the second image can then be compared to identify the pixel correspondences between the pixels of the pair of images. In some embodiments, the digital design system identifies pixel correspondence using nearest neighbor matching to identify a first feature vector for a first pixel in the first image and a second feature vector for a second pixel in the second image that most closely match based on their corresponding features. In one or more embodiments, nearest neighbor matching is performed until all, or a subset of all, pixel correspondences are identified.

In one or more embodiments, the second machine learning model is trained to determine the pixel clusters representing the animated character based on the determined pixel correspondences between the pair of images. In one or more embodiments, the processing devices generates a first superpixel representation of the first image and a second superpixel representation of the second image. In some embodiments, the superpixels are determined using a superpixel segmentation method or algorithm, which group pixels together into superpixel groups, where pixels within a same superpixel are assumed to share the same or similar motion transformations.

The processing device then extracts rotation data and translation data for each superpixel. In one or more embodiments, extracting rotation data and translation data for each superpixel includes selecting pairs of pixel correspondences from the determined pixel correspondences, where each pair includes a first pixel in the first image and a corresponding second pixel in the second image. Position data is then determined for each pair of pixel correspondences, including position data associated with the first pixel in the first image and position data associated with the corresponding second pixel in the second image. The second machine learning model then extracts the rotation data and the translation data for the selected pairs of pixel correspondences. The processing device then averages the results for pairs of pixel correspondences associated with the same superpixel to generate the rotation data and the translation data for the superpixel.

The processing device then clusters pixels based on the extracted rotation data and the extracted translation data based on their motion similarity, or affinity. In one or more embodiments, the affinity can be computed based on motion residuals. In one or more embodiments, the processing device applies the extracted rotation data and the extracted translation data of a first superpixel to a second superpixel to create a transformed second superpixel, computes motion residue using first position data of pixels of the first superpixel and second position data of pixels of the transformed second superpixel, and then computes a superpixel affinity matrix using the computed motion residue. Spectral clustering can then be applied to the superpixel affinity matrix to obtain a cluster assignment for the first superpixel and the second superpixel.

As shown in FIG. 8, the method 800 also includes an act 806 of selecting a subset of clusters from the determined pixel clusters that reconstructs the different poses of the animated character. The determined pixel clusters for each pair of images in the plurality of images, each representing a different segment of the animated character, can then be aggregated as a set of candidate segments. For example, given a human animated character, each pair of images can produce a head segment, a torso segment, a left arm segment, a right arm segment, a left leg segment, and a right leg segment. In one or more embodiments, the processing device then selects the clusters (e.g., segments) from the set of candidate segments that best reconstructs the different poses of the animated character in the input sprite sheet with a minimal reconstruction error. For example, one cluster for each of the segments of the animated character can be selected from the set of candidate segments.

As shown in FIG. 8, the method 800 also includes an act 808 of creating a rigged animated character based on the selected subset of clusters. After the subset of clusters has been selected, the selected segments can be connected as a character rig, which can then be manipulated/deformed to recreate at least the poses in the input sprite sheet. The character rig can further be used to create an animated sequence.

FIG. 9 illustrates a flowchart of a series of acts in a method of training neural networks to extract articulated parts of animated characters from sprite sheets in accordance with one or more embodiments. In one or more embodiments, the method 900 is performed in a digital medium environment that includes the digital design system 700. The method 900 is intended to be illustrative of one or more methods in accordance with the present disclosure and is not intended to limit potential embodiments. Alternative embodiments can include additional, fewer, or different steps than those articulated in FIG. 9.

As shown in FIG. 9, the method 900 includes an act 902 of receiving a first training input including images representing different poses of an animated character and a second training input including pixel correspondences between pairs of poses of the different poses. In one or more embodiments, the input can include a sprite sheet that includes the different poses of the animated character and/or pre-selected image pairs from the different poses of the animated character. The input can further include ground truth data, including ground truth pixel correspondences that can be used to train a first neural network (e.g., a correspondence module) and ground truth candidate segments that can be used to train a second neural network (e.g., a clustering module). In one or more embodiments, the digital design system receives the input from a user (e.g., via a computing device). In other embodiments, the digital design system retrieves the training input from a storage or memory location.

As shown in FIG. 9, the method 900 also includes an act 904 of training, by the processing device, a first machine learning model based on the first training input to generate a trained first machine learning model to determine pixel correspondences between pixels of a pair of poses from the different poses. In one or more embodiments, the digital design system generates first training data from the first training input. The first training data can include a training image pair, where each image in the training image pair is a different pose of the animated character received in the training input. The digital design system then generates a preprocessed training image by concatenating a first image from the training image pair with a second image from the training image pair and generates a feature map of the preprocessed training image. The feature map includes a plurality of feature vectors, where each feature vector includes feature data corresponding to a pixel of the preprocessed training image. The digital design system identifies the pixel correspondences between the pixels of the training image pair based on comparing feature vectors associated with pixels of the first image with feature vectors associated with pixels of the second image. The digital design system calculates an Info Noise-Contrastive Estimation (InfoNCE) loss using the identified pixel correspondences with ground truth pixel correspondences and trains the first machine learning model through backpropagation of the calculated loss.

As shown in FIG. 9, the method 900 also includes an act 906 of training, by the processing device, a second machine learning model based on the second training input to generate a trained second machine learning model to determine pixel clusters representing structural segments of the animated character. The second training input can include training pixel correspondence data for a training image pair representing different poses of the animated character and ground truth candidate segments generated for the training image pair. In one or more embodiments, the digital design system uses the training pixel correspondence data for a training image pair to determines the pixel clusters representing the animated character. In one or more embodiments, the digital design system extracts translation and rotation data for pairs of corresponding pixels and clusters the pixels into pixel clusters based on their motion similarities. The digital design system then determines the structural segments of the animated character (e.g., the training candidate segments) based on the determined pixel clusters. The digital design system calculates a binary cross-entropy (BCE) loss using the determined structural segments of the animated character with ground truth structural segments of the animated character and trains the first machine learning model through backpropagation of the calculated loss.

Figure 10:
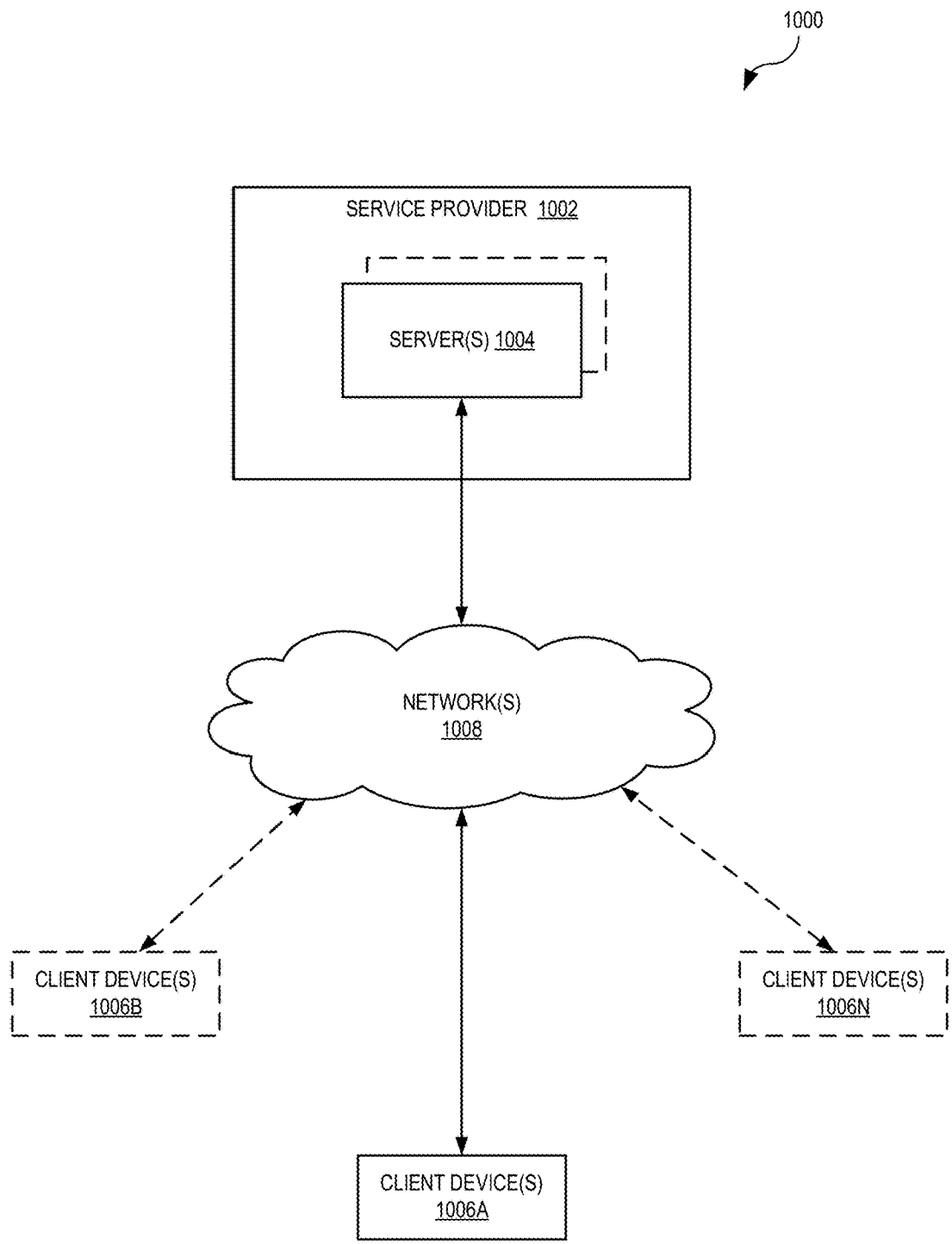
FIG. 10 illustrates a schematic diagram of an exemplary environment in which the digital design system can operate in accordance with one or more embodiments.

FIG. 10 illustrates a schematic diagram of an exemplary environment 1000 in which the digital design system 700 can operate in accordance with one or more embodiments. In one or more embodiments, the environment 1000 includes a service provider 1002 which may include one or more servers 1004 connected to a plurality of client devices 1006A-1006N via one or more networks 1008. The client devices 1006A-1006N, the one or more networks 1008, the service provider 1002, and the one or more servers 1004 may communicate with each other or other components using any communication platforms and technologies suitable for transporting data and/or communication signals, including any known communication technologies, devices, media, and protocols supportive of remote data communications, examples of which will be described in more detail below with respect to FIG. 11.

Although FIG. 10 illustrates a particular arrangement of the client devices 1006A-1006N, the one or more networks 1008, the service provider 1002, and the one or more servers 1004, various additional arrangements are possible. For example, the client devices 1006A-1006N may directly communicate with the one or more servers 1004, bypassing the network 1008. Or alternatively, the client devices 1006A-1006N may directly communicate with each other. The service provider 1002 may be a public cloud service provider which owns and operates their own infrastructure in one or more data centers and provides this infrastructure to customers and end users on demand to host applications on the one or more servers 1004. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1004. In some embodiments, the service provider may be a private cloud provider which maintains cloud infrastructure for a single organization. The one or more servers 1004 may similarly include one or more hardware servers, each with its own computing resources, which are divided among applications hosted by the one or more servers for use by members of the organization or their customers.

Similarly, although the environment 1000 of FIG. 10 is depicted as having various components, the environment 1000 may have additional or alternative components. For example, the environment 1000 can be implemented on a single computing device with the digital design system 700. In particular, the digital design system 700 may be implemented in whole or in part on the client device 1006A. Alternatively, in some embodiments, the environment 1000 is implemented in a distributed architecture across multiple computing devices.

As illustrated in FIG. 10, the environment 1000 may include client devices 1006A-1006N. The client devices 1006A-1006N may comprise any computing device. For example, client devices 1006A-1006N may comprise one or more personal computers, laptop computers, mobile devices, mobile phones, tablets, special purpose computers, TVs, or other computing devices, including computing devices described below with regard to FIG. 11. Although three client devices are shown in FIG. 10, it will be appreciated that client devices 1006A-1006N may comprise any number of client devices (greater or smaller than shown).

Moreover, as illustrated in FIG. 10, the client devices 1006A-1006N and the one or more servers 1004 may communicate via one or more networks 1008. The one or more networks 1008 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1008 may be any suitable network over which the client devices 1006A-1006N may access the service provider 1002 and server 1004, or vice versa. The one or more networks 1008 will be discussed in more detail below with regard to FIG. 11.

In addition, the environment 1000 may also include one or more servers 1004. The one or more servers 1004 may generate, store, receive, and transmit any type of data, including input data 720 and training data 722 or other information. For example, a server 1004 may receive data from a client device, such as the client device 1006A, and send the data to another client device, such as the client device 1006B and/or 1006N. The server 1004 can also transmit electronic messages between one or more users of the environment 1000. In one example embodiment, the server 1004 is a data server. The server 1004 can also comprise a communication server or a web-hosting server. Additional details regarding the server 1004 will be discussed below with respect to FIG. 11.

As mentioned, in one or more embodiments, the one or more servers 1004 can include or implement at least a portion of the digital design system 700. In particular, the digital design system 700 can comprise an application running on the one or more servers 1004 or a portion of the digital design system 700 can be downloaded from the one or more servers 1004. For example, the digital design system 700 can include a web hosting application that allows the client devices 1006A-1006N to interact with content hosted at the one or more servers 1004. To illustrate, in one or more embodiments of the environment 1000, one or more client devices 1006A-1006N can access a webpage supported by the one or more servers 1004. In particular, the client device 1006A can run a web application (e.g., a web browser) to allow a user to access, view, and/or interact with a webpage or website hosted at the one or more servers 1004.

Upon the client device 1006A accessing a webpage or other web application hosted at the one or more servers 1004, in one or more embodiments, the one or more servers 1004 can provide a user of the client device 1006A with an interface to provide inputs, including a sprite sheet. Upon receiving the sprite sheet, the one or more servers 1004 can automatically perform the methods and processes described above to extract articulated parts of an animated character from the sprite sheet.

As just described, the digital design system 700 may be implemented in whole, or in part, by the individual elements 1002-1008 of the environment 1000. It will be appreciated that although certain components of the digital design system 700 are described in the previous examples with regard to particular elements of the environment 1000, various alternative implementations are possible. For instance, in one or more embodiments, the digital design system 700 is implemented on any of the client devices 1006A-1006N. Similarly, in one or more embodiments, the digital design system 700 may be implemented on the one or more servers 1004. Moreover, different components and functions of the digital design system 700 may be implemented separately among client devices 1006A-1006N, the one or more servers 1004, and the network 1008.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
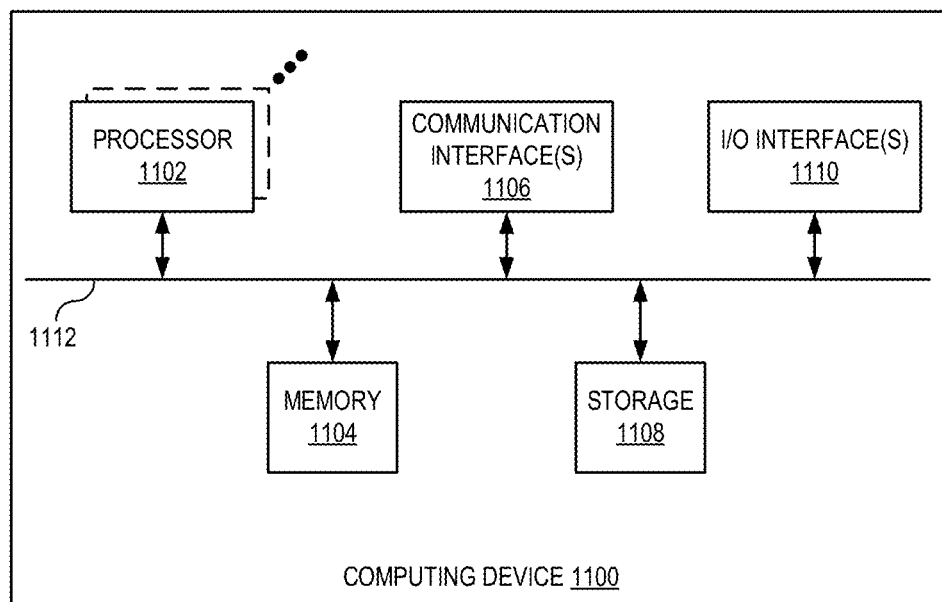
FIG. 11 illustrates a block diagram of an exemplary computing device in accordance with one or more embodiments.

FIG. 11 illustrates, in block diagram form, an exemplary computing device 1100 that may be configured to perform one or more of the processes described above. One will appreciate that one or more computing devices such as the computing device 1100 may implement the digital design system 700. As shown by FIG. 11, the computing device can comprise a processor 1102, memory 1104, one or more communication interfaces 1106, a storage device 1108, and one or more input or output ("I/O") devices/interfaces 1110. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1108 and decode and execute them. In various embodiments, the processor(s) 1102 may include one or more central processing units (CPUs), graphics processing units (GPUs), field programmable gate arrays (FPGAs), systems on chip (SoC), or other processor(s) or combinations of processors.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The computing device 1100 can further include one or more communication interfaces 1106. A communication interface 1106 can include hardware, software, or both. The communication interface 1106 can provide one or more interfaces for communication (such as, for example, packet-based communication) between the computing device and one or more other computing devices 1100 or one or more networks. As an example, and not by way of limitation, communication interface 1106 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

The computing device 1100 includes a storage device 1108 includes storage for storing data or instructions. As an example, and not by way of limitation, storage device 1108 can comprise a non-transitory storage medium described above. The storage device 1108 may include a hard disk drive (HDD), flash memory, a Universal Serial Bus (USB) drive or a combination these or other storage devices. The computing device 1100 also includes one or more I/O devices/interfaces 1110, which are provided to allow a user to provide input to (such as user strokes), receive output from, and otherwise transfer data to and from the computing device 1100. These I/O devices/interfaces 1110 may include a mouse, keypad or a keyboard, a touch screen, camera, optical scanner, network interface, modem, other known I/O devices or a combination of such I/O devices/interfaces 1110. The touch screen may be activated with a stylus or a finger.

The I/O devices/interfaces 1110 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1110 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
 receiving, by a processing device, an input including a plurality of images depicting an animated character in different poses;
 for each pair of images in the plurality of images,
  determining, by a first machine learning model, pixel correspondences between pixels of the pair of images, and
  determining, by a second machine learning model, pixel clusters representing the animated character based on the determined pixel correspondences between the pair of images, each pixel cluster of the pixel clusters corresponding to a different structural segment of the animated character;
 selecting a subset of clusters from the determined pixel clusters that reconstructs the different poses of the animated character; and
 creating a rigged animated character based on the selected subset of clusters.

2. The method of claim 1, wherein determining pixel correspondences between the pixels of the pair of images comprises:
 generating a preprocessed image by concatenating a first image from the pair of images with a second image from the pair of images;
 generating a feature map of the preprocessed image, wherein each feature vector of the generated feature map corresponds to a pixel of the preprocessed image; and
 identifying the pixel correspondences between the pixels of the pair of images based on comparing feature vectors associated with pixels of the first image with feature vectors associated with pixels of the second image.

3. The method of claim 2, wherein identifying the pixel correspondences between the pixels of the pair of images further comprises:
 using nearest neighbor matching to identify a first feature vector for a first pixel in the first image and a second feature vector for a second pixel in the second image.

4. The method of claim 2, wherein determining pixel clusters representing the animated character based on the determined pixel correspondences between the pair of images comprises:
 generating a first superpixel representation of the first image and a second superpixel representation of the second image, wherein the pixels associated with a superpixel have similar features;

extracting rotation data and translation data for each superpixel; and clustering pixels based on the extracted rotation data and the extracted translation data.

5. The method of claim 4, extracting the rotation data and the translation data for each superpixel further comprises:

selecting pairs of pixel correspondences from the determined pixel correspondences, each pair including a first pixel in the first image and a corresponding second pixel in the second image;

determining position data for each pair of pixel correspondences, including position data associated with the first pixel in the first image and position data associated with the corresponding second pixel in the second image; and providing the position data to the second machine learning model to extract the rotation data and the translation data for the selected pairs of pixel correspondences.

6. The method of claim 5, further comprising:

averaging results for pairs of pixel correspondences associated with a superpixel to generate the rotation data and the translation data for the superpixel.

7. The method of claim 5, wherein clustering pixels based on the extracted rotation data and the extracted translation data further comprises:

applying the extracted rotation data and the extracted translation data of a first superpixel to a second superpixel to create a transformed second superpixel;

computing motion residue using first position data of pixels of the first superpixel and second position data of pixels of the transformed second superpixel;

computing a superpixel affinity matrix using the computed motion residue; and applying spectral clustering to the superpixel affinity matrix to obtain a cluster assignment for the first superpixel and the second superpixel.

8. The method of claim 1, wherein selecting a subset of clusters from the determined pixel clusters that reconstructs the different poses of the animated character further comprises:

selecting a number of clusters that reconstructs the different poses of the animated character with a minimal reconstruction error.

9. The method of claim 1, wherein selecting the subset of clusters from the determined pixel clusters that reconstructs the different poses of the animated character further comprises: aggregating the determined pixel clusters for each pair of images in the plurality of images.

10. A non-transitory computer-readable storage medium storing executable instructions, which when executed by a processing device, cause the processing device to perform operations comprising:

receiving, by a processing device, an input including a plurality of images depicting an animated character in different poses;

for each pair of images in the plurality of images,
determining, by a first machine learning model, pixel correspondences between pixels of the pair of images, and determining, by a second machine learning model, pixel clusters representing the animated character based on the determined pixel correspondences between the pair of images, each pixel cluster of the pixel clusters corresponding to a different structural segment of the animated character;

selecting a subset of clusters from the determined pixel clusters that reconstructs the different poses of the animated character; and creating a rigged animated character based on the selected subset of clusters.

11. The non-transitory computer-readable storage medium of claim 10, wherein to determine pixel correspondences between the pixels of the pair of images the instructions further cause the processing device to perform operations comprising:

generating a preprocessed image by concatenating a first image from the pair of images with a second image from the pair of images;

generating a feature map of the preprocessed image, wherein each feature vector of the generated feature map corresponds to a pixel of the preprocessed image; and identifying the pixel correspondences between the pixels of the pair of images based on comparing feature vectors associated with pixels of the first image with feature vectors associated with pixels of the second image.

12. The non-transitory computer-readable storage medium of claim 11, wherein to identify the pixel correspondences between the pixels of the pair of images the instructions further cause the processing device to perform operations comprising:

using nearest neighbor matching to identify a first feature vector for a first pixel in the first image and a second feature vector for a second pixel in the second image.

13. The non-transitory computer-readable storage medium of claim 11, wherein to determine pixel clusters representing the animated character based on the determined pixel correspondences between the pair of images the instructions further cause the processing device to perform operations comprising:

generating a first superpixel representation of the first image and a second superpixel representation of the second image, wherein the pixels associated with a superpixel have similar features;

extracting rotation data and translation data for each superpixel; and clustering pixels based on the extracted rotation data and the extracted translation data.

14. The non-transitory computer-readable storage medium of claim 13, wherein to extract the rotation data and the translation data for each superpixel the instructions further cause the processing device to perform operations comprising:

selecting pairs of pixel correspondences from the determined pixel correspondences, each pair including a first pixel in the first image and a corresponding second pixel in the second image;

determining position data for each pair of pixel correspondences, including position data associated with the first pixel in the first image and position data associated with the corresponding second pixel in the second image; and providing the position data to the second machine learning model to extract the rotation data and the translation data for the selected pairs of pixel correspondences.

15. The non-transitory computer-readable storage medium of claim 14, wherein to cluster the pixels based on the extracted rotation data and the extracted translation data the instructions further cause the processing device to perform operations comprising:

applying the extracted rotation data and the extracted translation data of a first superpixel to a second superpixel to create a transformed second superpixel;

computing motion residue using first position data of pixels of the first superpixel and second position data of pixels of the transformed second superpixel;

computing a superpixel affinity matrix using the computed motion residue; and applying spectral clustering to the superpixel affinity matrix to obtain a cluster assignment for the first superpixel and the second superpixel.

16. The non-transitory computer-readable storage medium of claim 10, wherein to select a subset of clusters from the determined pixel clusters that reconstructs the different poses of the animated character the instructions further cause the processing device to perform operations comprising:

selecting a number of clusters that reconstructs the different poses of the animated character with a minimal reconstruction error.

17. A system comprising:

a memory component; and a processing device coupled to the memory component, the processing device to perform operations comprising:

receiving a first training input including images representing different poses of an animated character and a second training input including pixel correspondences between pairs of poses of the different poses;

training a first machine learning model based on the first training input to generate a trained first machine learning model to determine pixel correspondences between pixels of a pair of poses from the different poses; and training a second machine learning model based on the second training input to generate a trained second machine learning model to determine pixel clusters representing structural segments of the animated character.

18. The system of claim 17, wherein to generate the first machine learning model based on the first training input further the processing device further performs operations comprising:

generating first training data from the first training input, the first training data including a training image pair, each image in the training image pair representing a different pose of the animated character.

19. The system of claim 17, wherein to train the first machine learning model based on the first training input the processing device further performs operations comprising:

generating a preprocessed training image by concatenating a first image from a training image pair with a second image from the training image pair;

generating a feature map of the preprocessed training image, wherein each feature vector of the generated feature map corresponds to a pixel of the preprocessed training image;

identifying the pixel correspondences between the pixels of the training image pair based on comparing feature vectors associated with pixels of the first image with feature vectors associated with pixels of the second image; and training the first machine learning model by calculating a loss using the identified pixel correspondences with ground truth pixel correspondences.

20. The system of claim 17, wherein to train the second machine learning model based on the second training input the processing device further performs operations comprising:

determining pixel clusters representing the animated character based on the pixel correspondences between a training image pair representing different poses of the animated character;

determining the structural segments of the animated character based on the determined pixel clusters; and training the second machine learning model by calculating a loss using the determined structural segments of the animated character with ground truth structural segments of the animated character.

* * * * *

UNITED STATES PATENT AND TRADEMARK OFFICE
CERTIFICATE OF CORRECTION

| | | |
|---|---|---|
| PATENT NO. | : 11,875,442 B1 | Page 1 of 1 |
| APPLICATION NO. | : 17/829120 | |
| DATED | : January 16, 2024 | |
| INVENTOR(S) | : Matthew David Fisher et al. | |

It is certified that error appears in the above-identified patent and that said Letters Patent is hereby corrected as shown below:

On the Title Page

Item (73), should read:
(73) Assignees: Adobe Inc., San Jose, CA (US); University of Massachusetts, Boston, MA (US)

Signed and Sealed this
First Day of April, 2025

Coke Morgan Stewart
*Acting Director of the United States Patent and Trademark Office*